(12) United States Patent
Garbuz et al.

(10) Patent No.: US 9,863,364 B2
(45) Date of Patent: Jan. 9, 2018

(54) MICRO THRUSTER USES AND IMPROVEMENTS

(71) Applicant: GAME CHANGERS, LLC, New York, NY (US)

(72) Inventors: Piotr A. Garbuz, New York, NY (US); Jason D. Sanchez, San Antonio, TX (US)

(73) Assignee: GAME CHANGERS, LLC, New York, NY (US)

( * ) Notice: Subject to any disclaimer, the term of this patent is extended or adjusted under 35 U.S.C. 154(b) by 415 days.

(21) Appl. No.: 14/407,814

(22) PCT Filed: Jun. 14, 2013

(86) PCT No.: PCT/US2013/045879
§ 371 (c)(1),
(2) Date: Dec. 12, 2014

(87) PCT Pub. No.: WO2014/035531
PCT Pub. Date: Mar. 6, 2014

(65) Prior Publication Data
US 2015/0176525 A1    Jun. 25, 2015

Related U.S. Application Data

(60) Provisional application No. 61/660,337, filed on Jun. 15, 2012.

(51) Int. Cl.
*F02G 1/043* (2006.01)
*F03H 99/00* (2009.01)
*H02S 99/00* (2014.01)

(52) U.S. Cl.
CPC ............. *F02G 1/043* (2013.01); *F03H 99/00* (2013.01); *H02S 99/00* (2013.01)

(58) Field of Classification Search
CPC F05B 17/006; F05B 19/24; B01L 2400/0442; F03H 99/00; H02S 40/425
See application file for complete search history.

(56) References Cited

U.S. PATENT DOCUMENTS

| 7,329,959 B2 | 2/2008 | Kim et al. |
| 2004/0031259 A1 | 2/2004 | Baricos et al. |

(Continued)

FOREIGN PATENT DOCUMENTS

| WO | WO2011028287 | * 3/2011 | ................ F23R 3/42 |
| WO | 2012118994 A2 | 9/2012 | |

OTHER PUBLICATIONS

Extended European Search Report dated Apr. 4, 2016 by the European Patent Office in corresponding European Application No. 13833411.5 (8 pages).

(Continued)

*Primary Examiner* — William H Rodriguez
*Assistant Examiner* — William Breazeal
(74) *Attorney, Agent, or Firm* — Buchanan Ingersoll & Rooney PC

(57) ABSTRACT

NMSET and related device uses and improvements to the forces generated. Laminar flow control systems benefit from NMSET and related devices as they simplify installation and are easier to retrofit on existing aircraft. Necessary temperature gradients can me generated by using a heated material with the sides at different energy accommodation coefficients. Surface geometries can be used to increase the force generated. Photovoltaic film can be embedded into the membrane, providing a source of energy that can offset the power required for desired thrust. Intake scoops improve the air flow through the micro thrusters and surface geometries, and airflow diffusers increase air flow interaction with the hotter surface resulting in higher thrust outputs.

10 Claims, 33 Drawing Sheets

(56) References Cited

U.S. PATENT DOCUMENTS

| | | |
|---|---|---|
| 2008/0072565 A1 | 3/2008 | Bekey |
| 2009/0127549 A1* | 5/2009 | Walitzki ................. H01J 45/00 257/43 |
| 2009/0155117 A1* | 6/2009 | Rubio ....................... B01J 3/08 419/66 |
| 2010/0139239 A1 | 6/2010 | Gronland et al. |
| 2010/0139738 A1* | 6/2010 | Lee .................... H01L 31/0521 136/246 |
| 2011/0240622 A1 | 10/2011 | Sanchez et al. |
| 2012/0138749 A1 | 6/2012 | Ellinghaus |

OTHER PUBLICATIONS

International Search Report (PCT/ISA/210) dated Mar. 24, 2014, by the U.S. Patent Office as the International Searching Authority for International Application No. PCT/US2013/045879.

Gibbs, "The Physics and Relativity FAQ, How does a light-mill work?", Jul. 1996, at math.ucr.edu/home/baez/physics/General/LightMill/light-mill.html.

\* cited by examiner

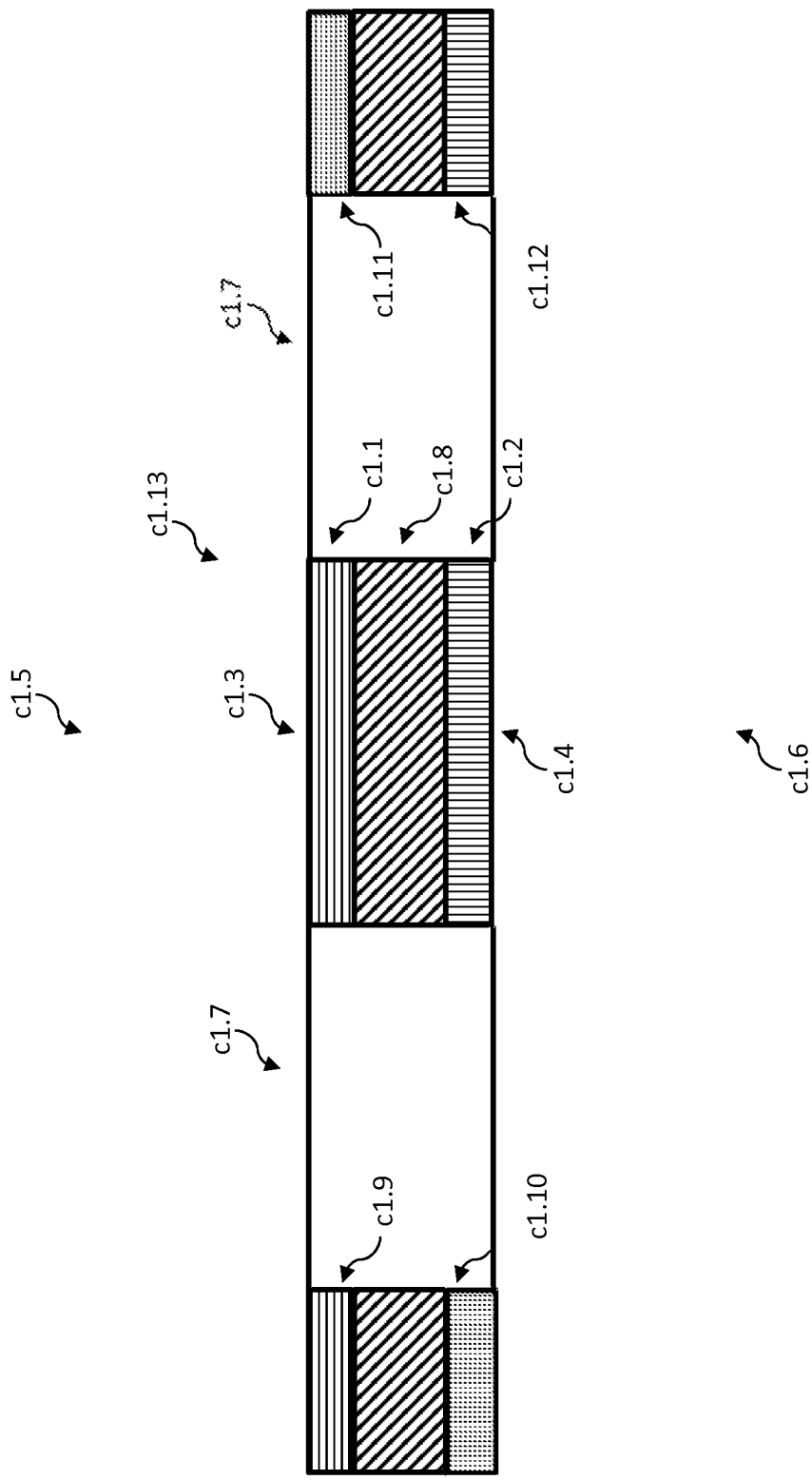
Figure 3.1

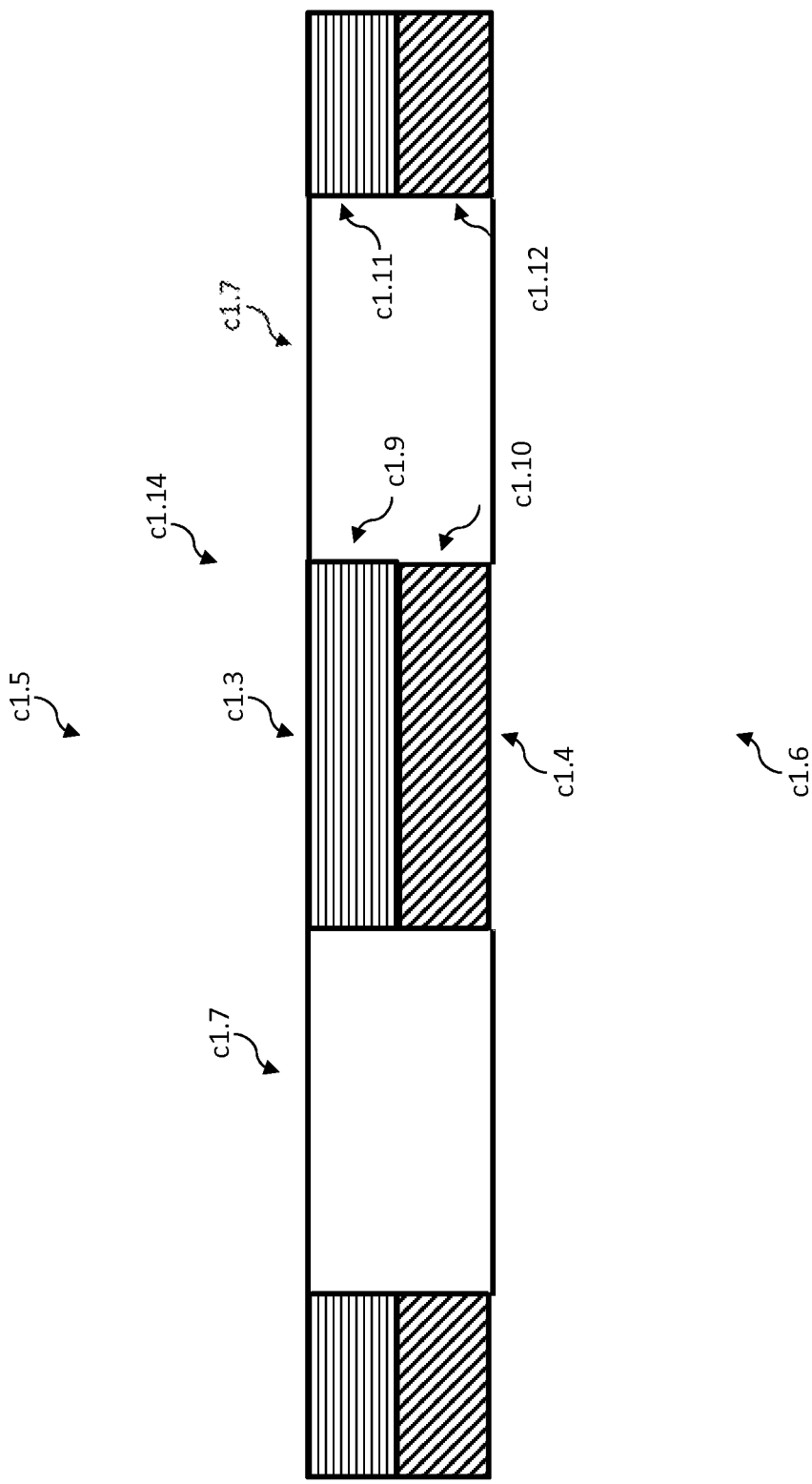
Figure 3.1a

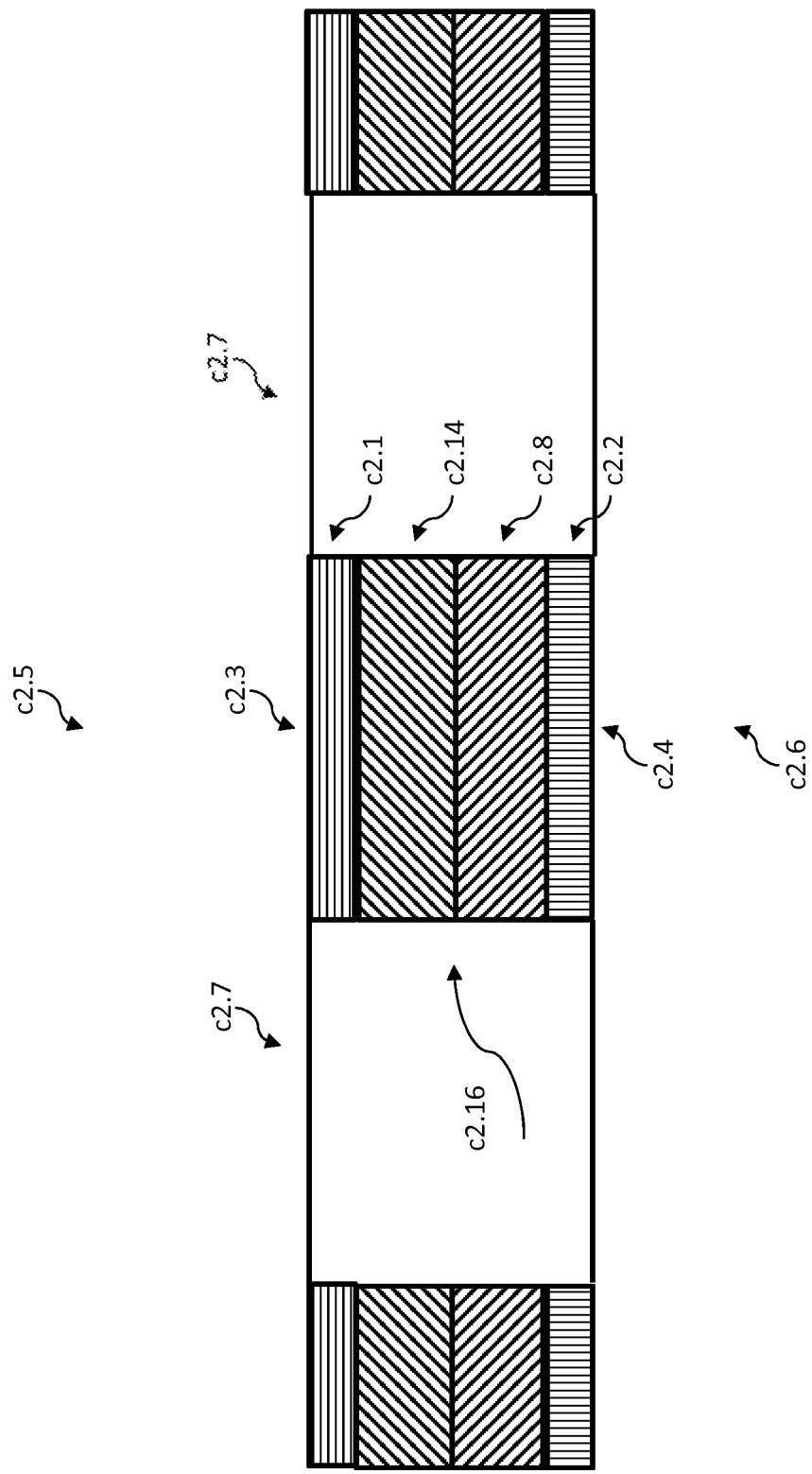
Figure 3.2

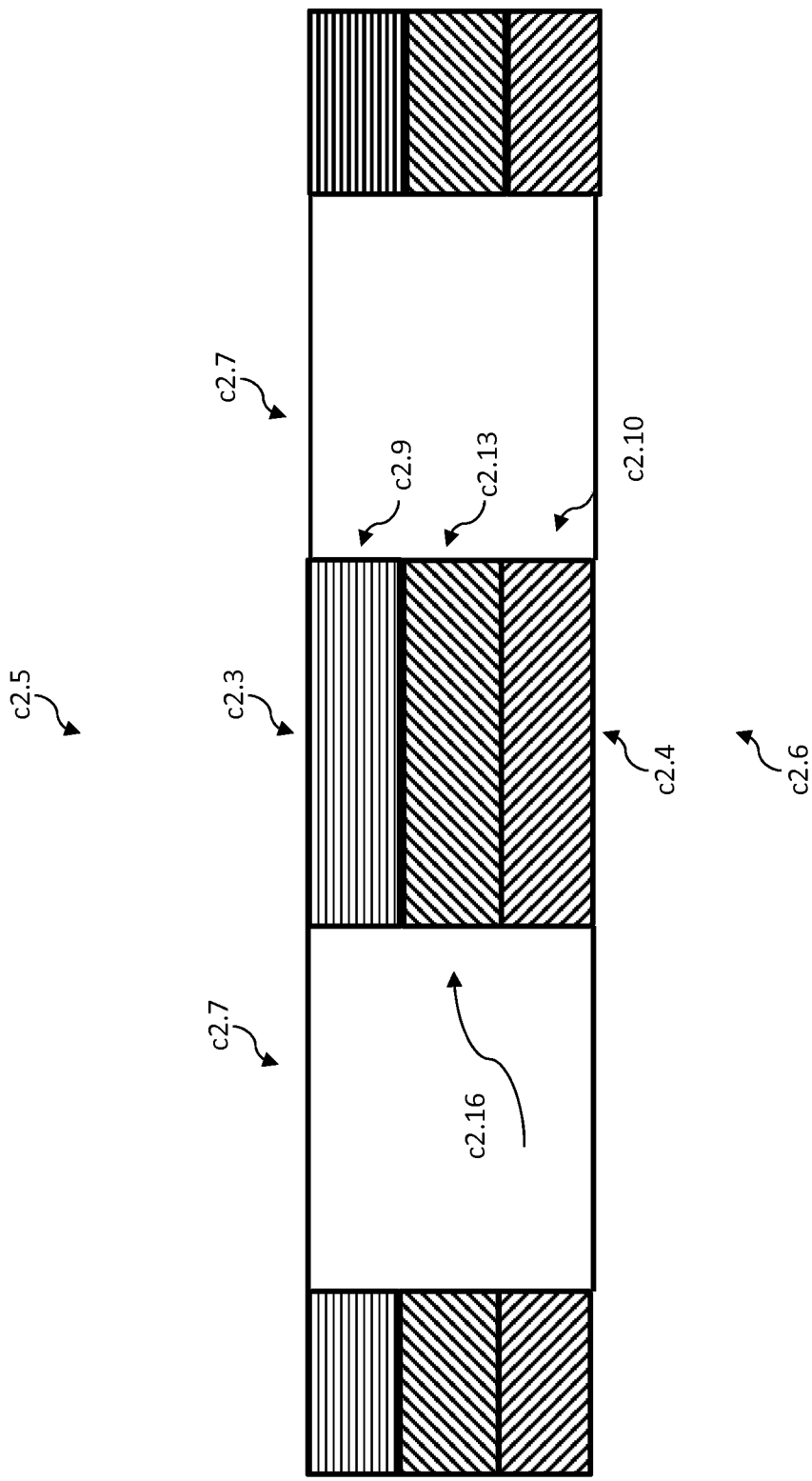
Figure 3.2a

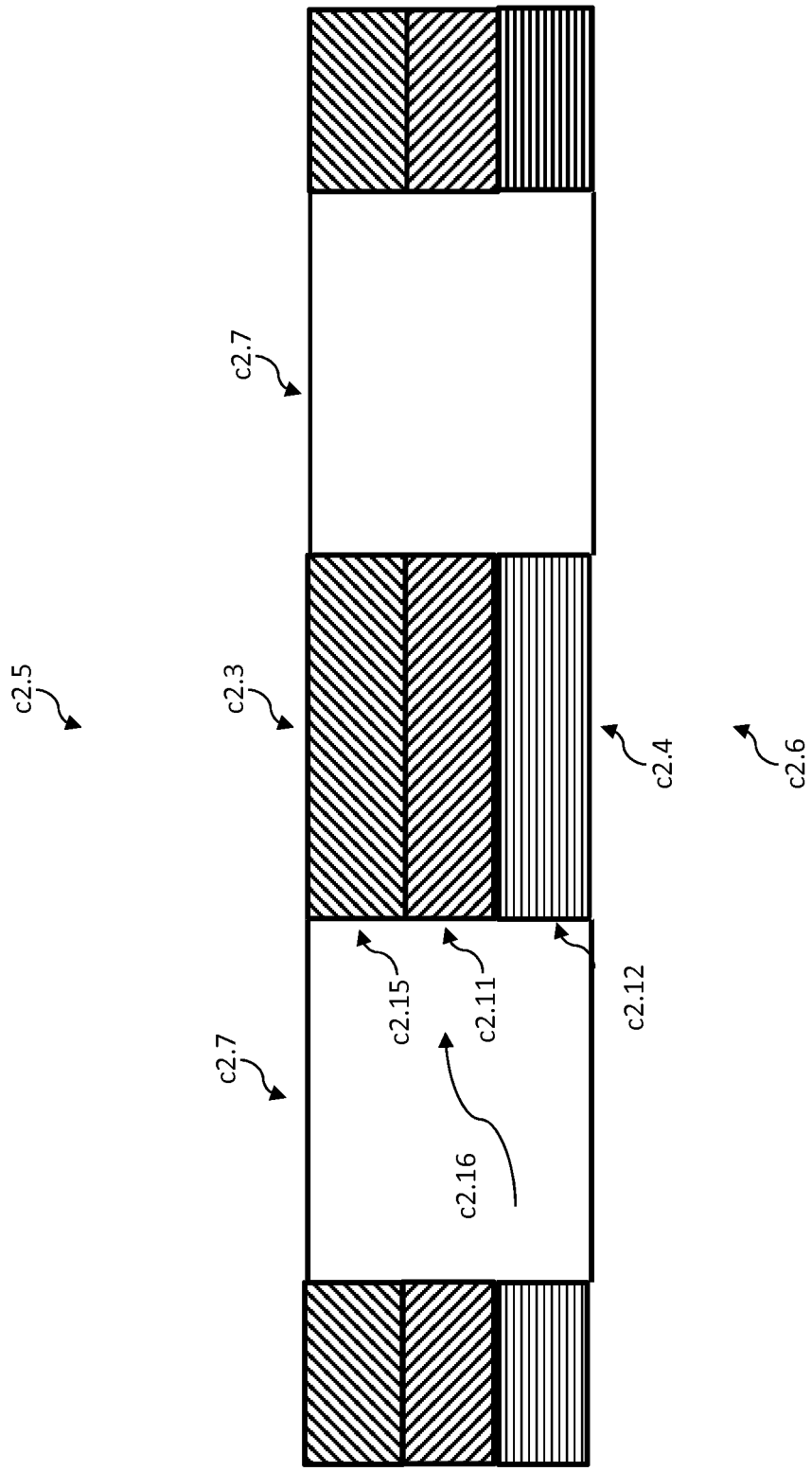
Figure 3.2b

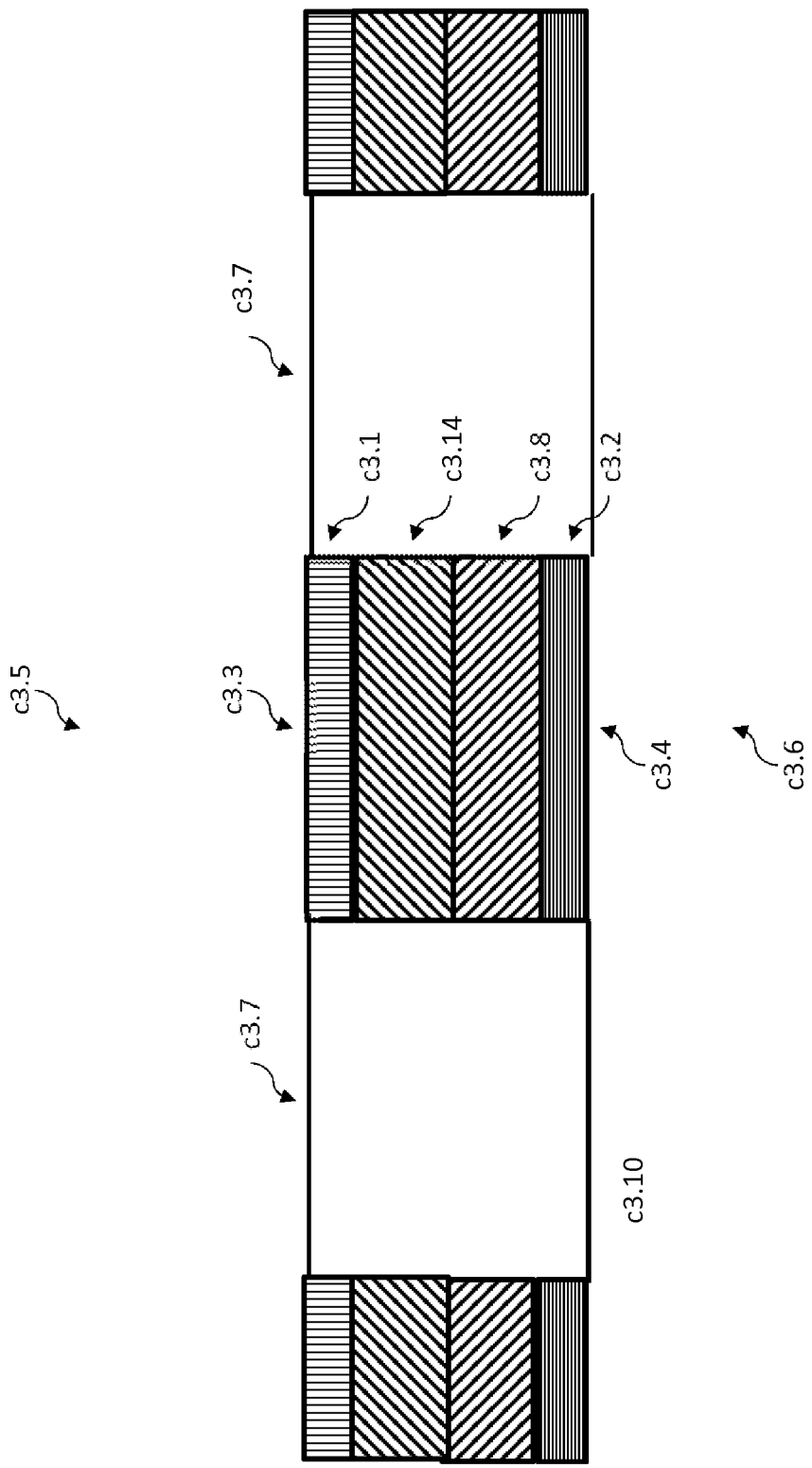
Figure 3.3

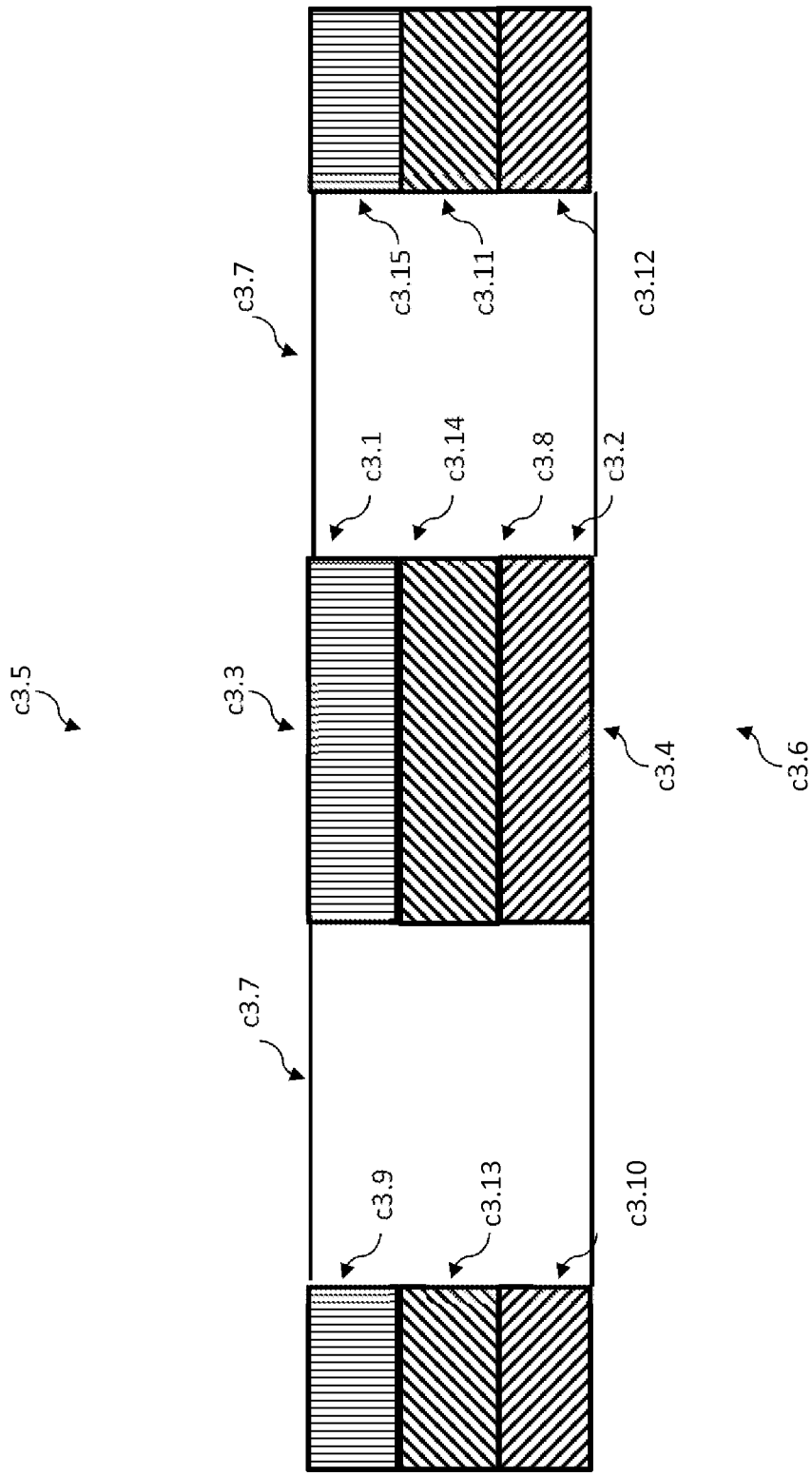
Figure 3.3a

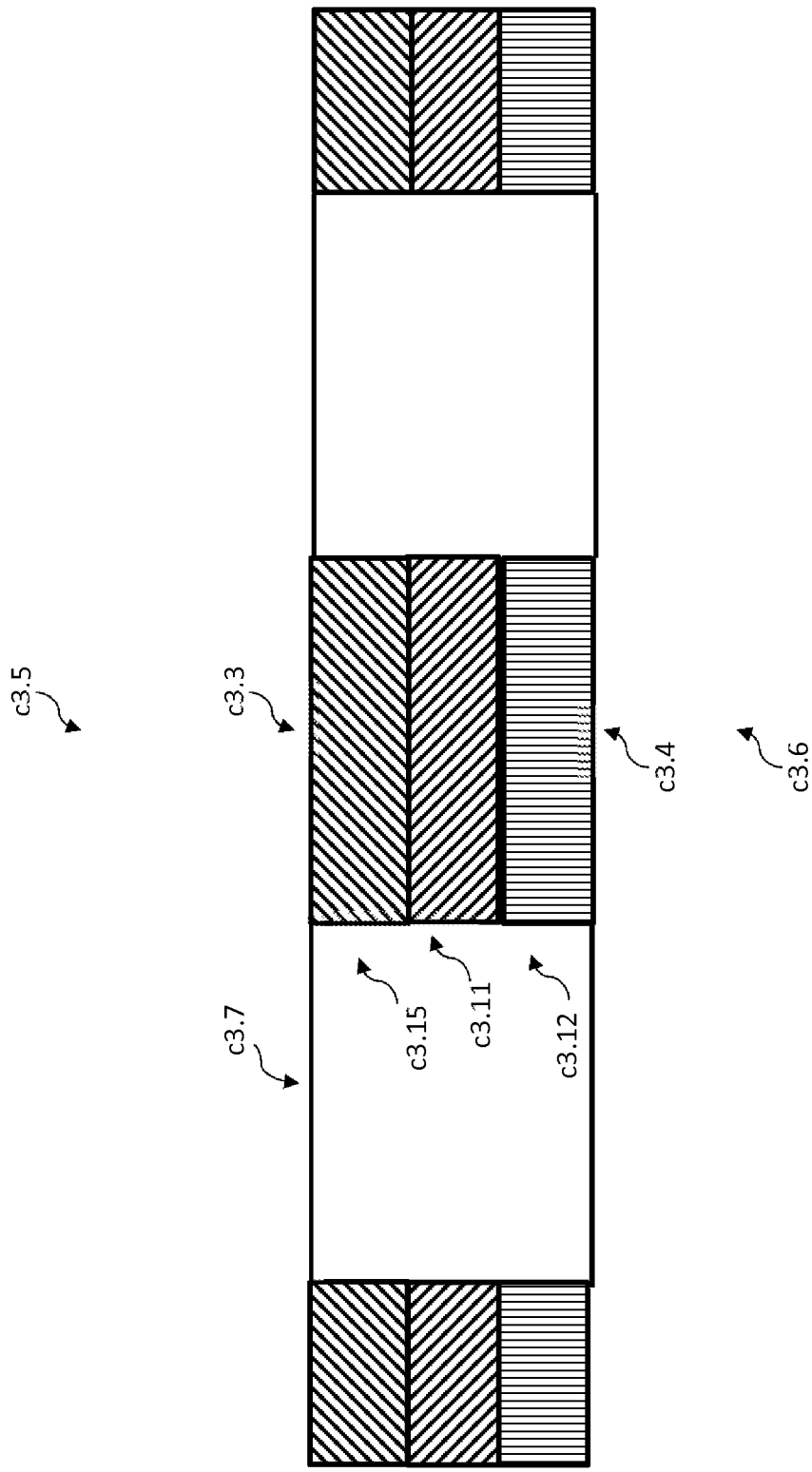
Figure 3.3b

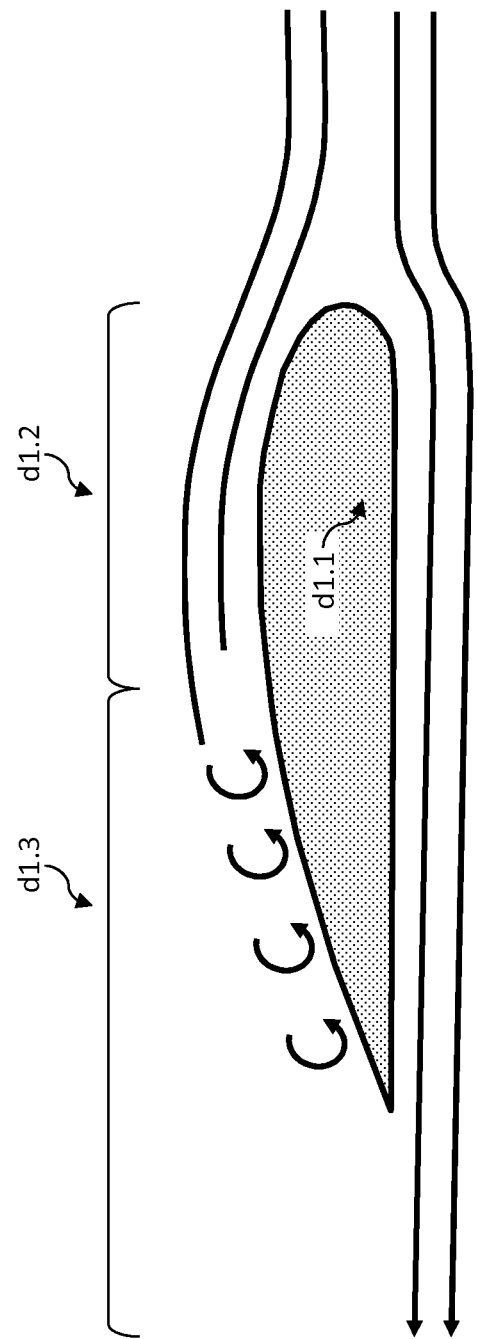
Figure 4.1

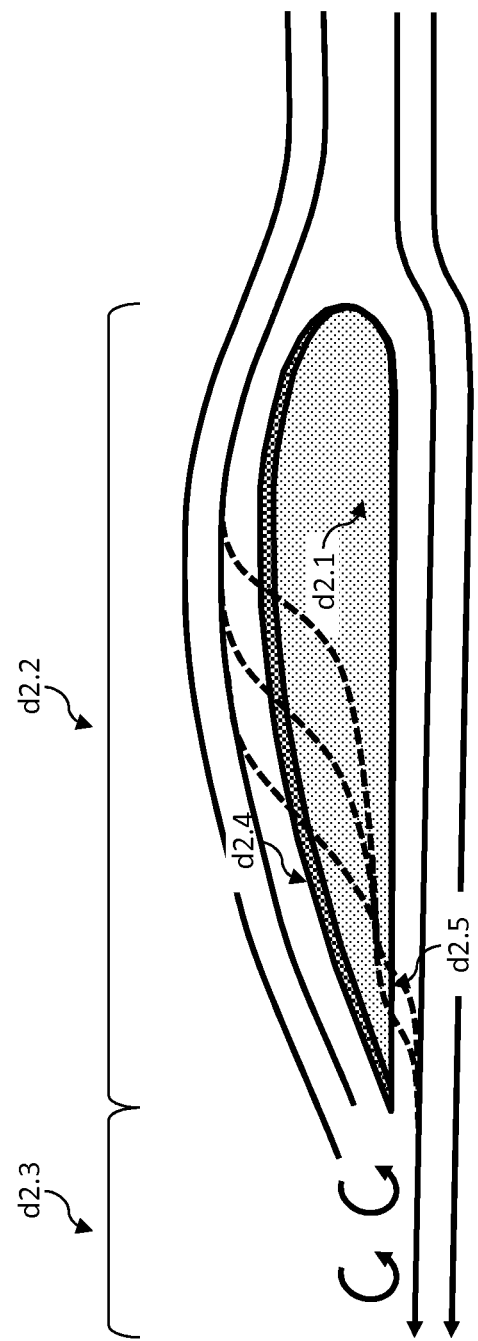
Figure 4.2

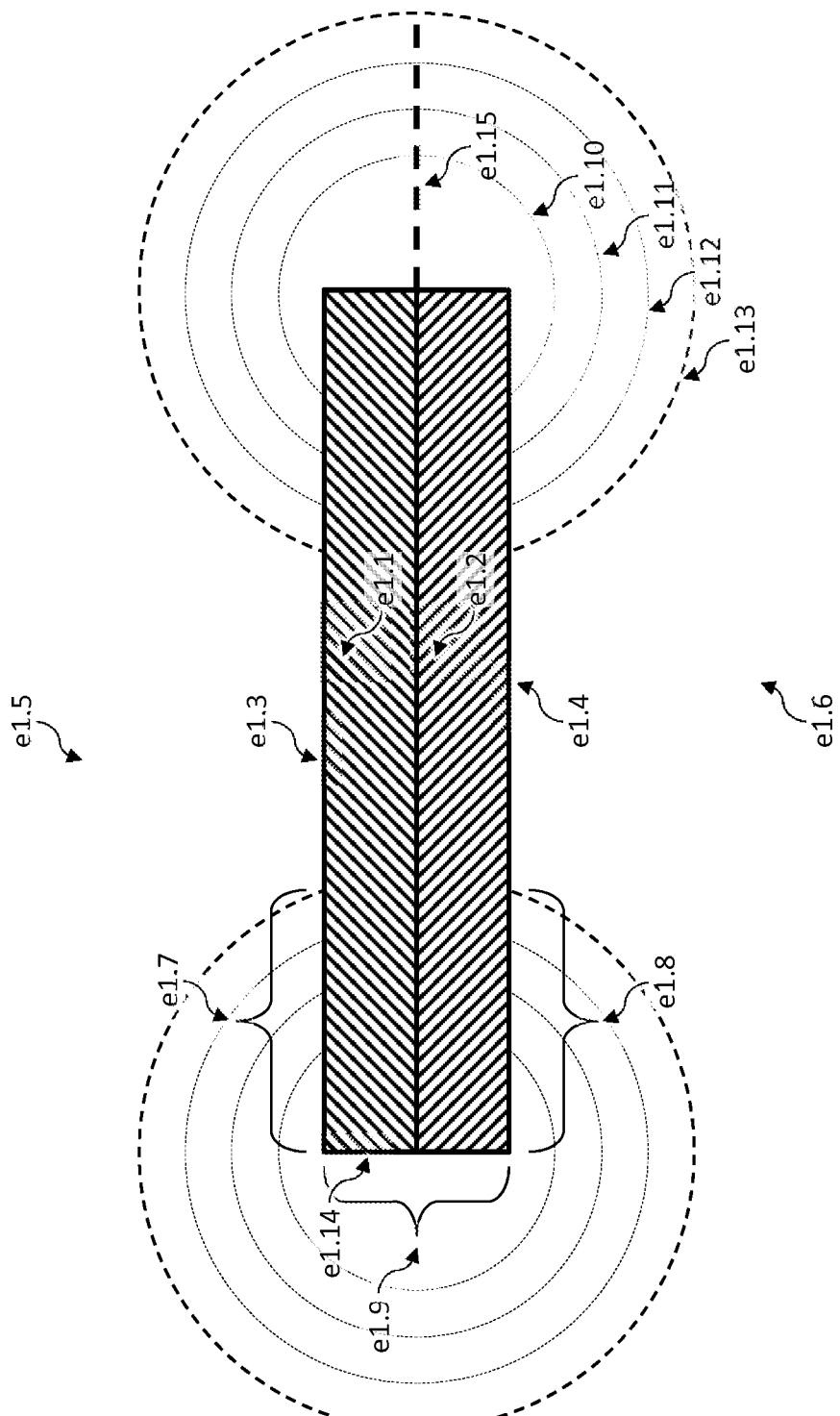
Figure 5.1

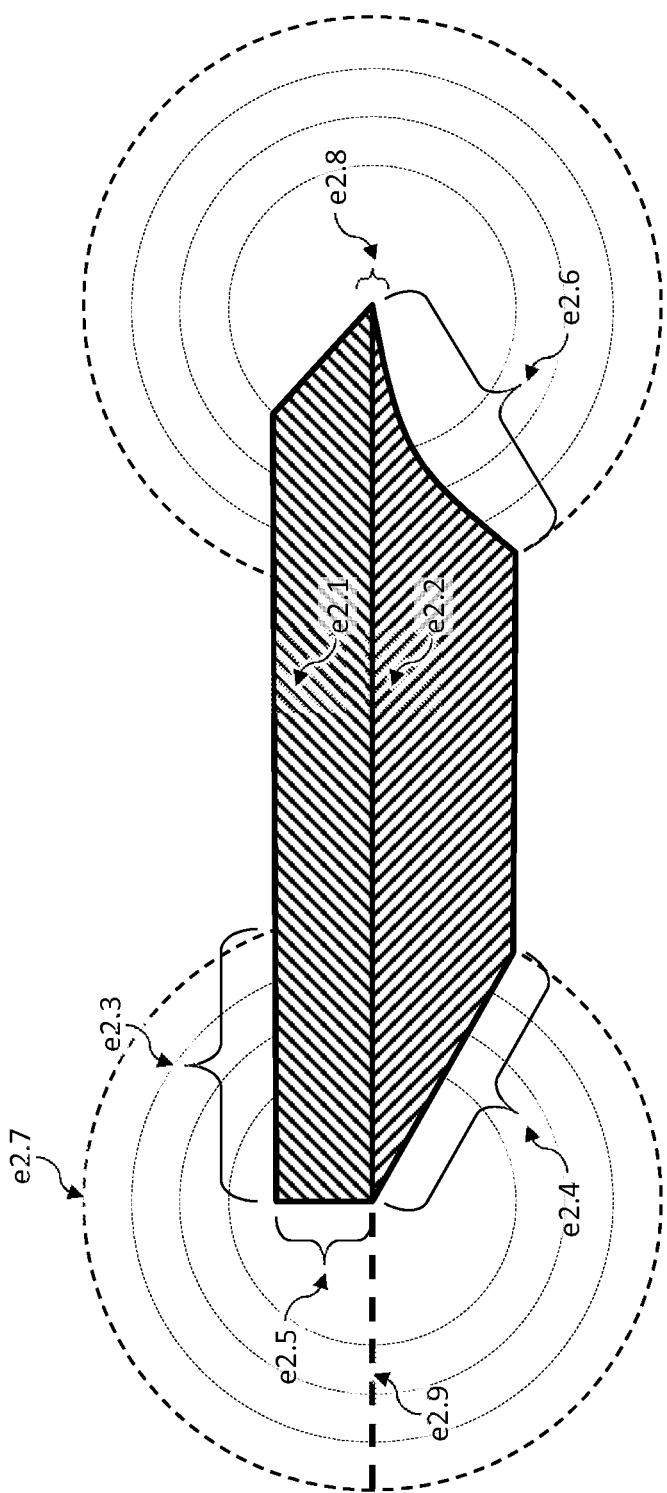
Figure 5.2

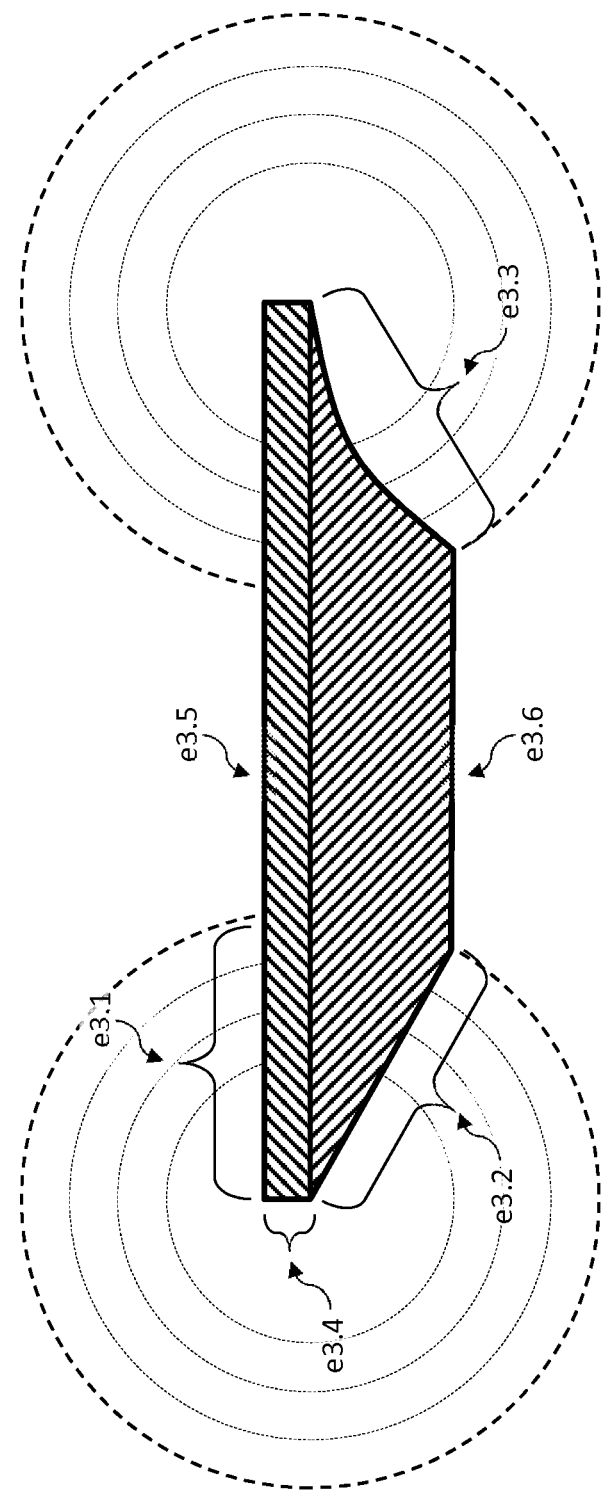
Figure 5.3

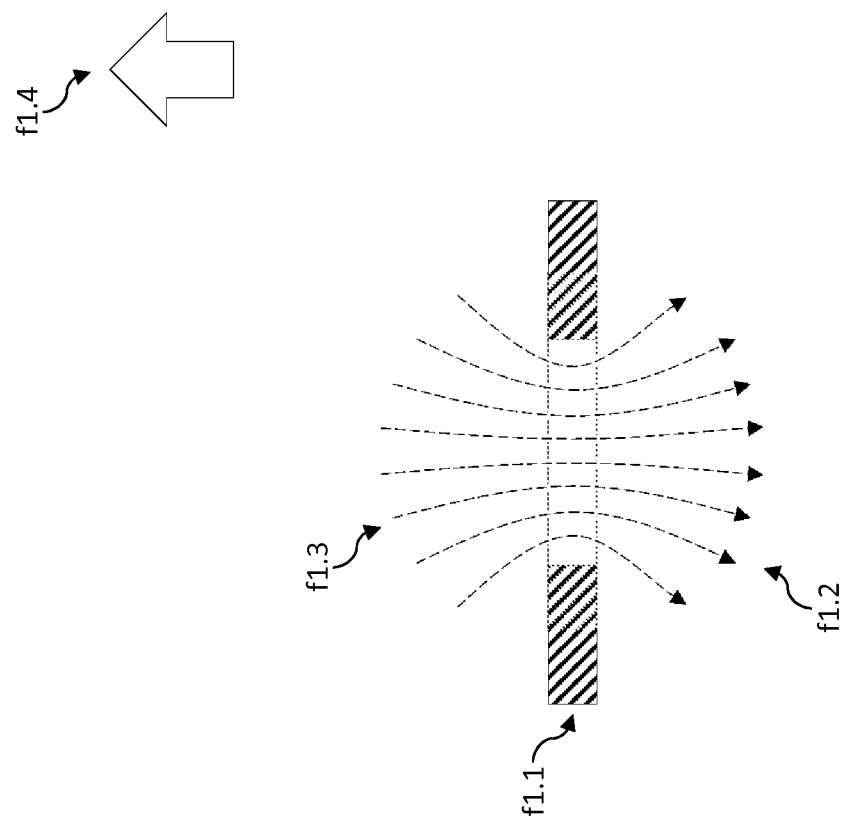
Figure 6.1

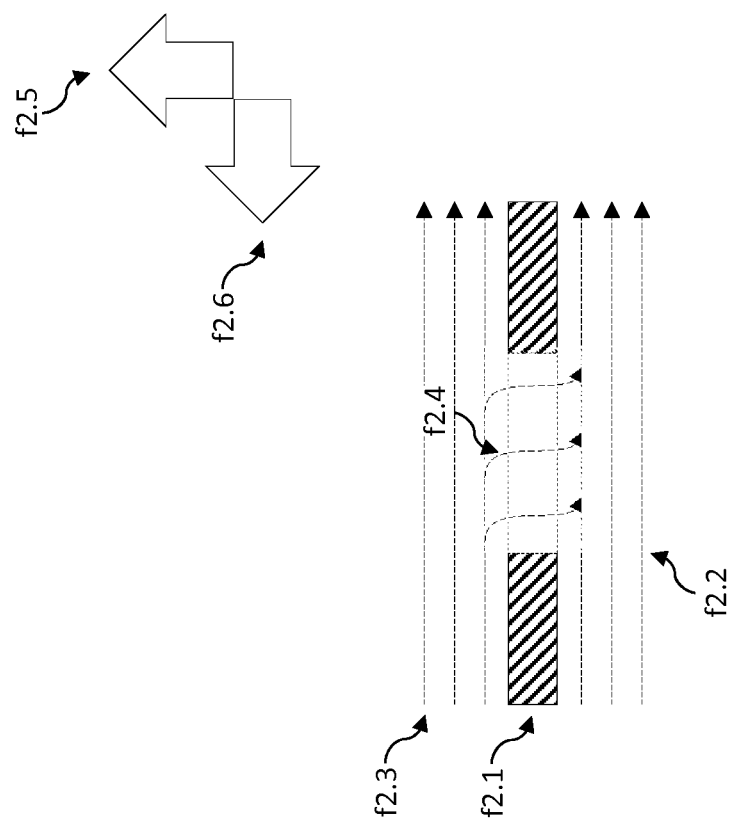
Figure 6.2

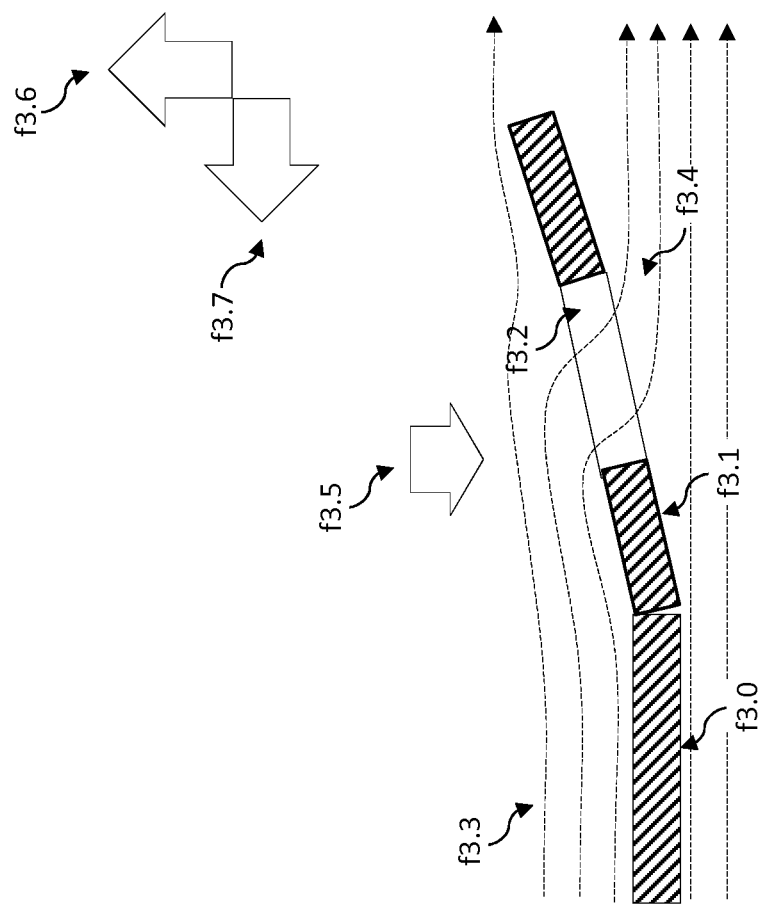
Figure 6.3

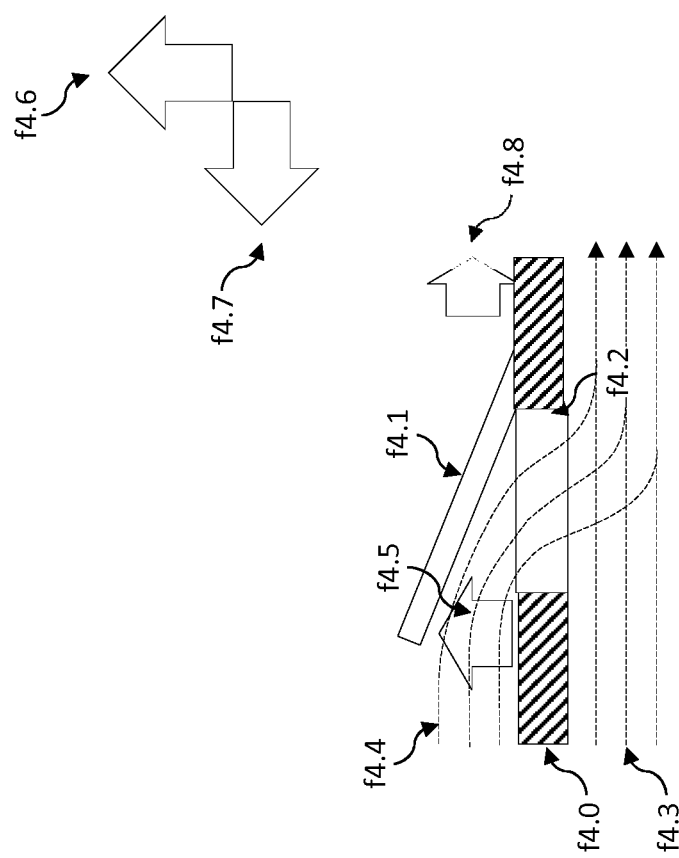
Figure 6.4

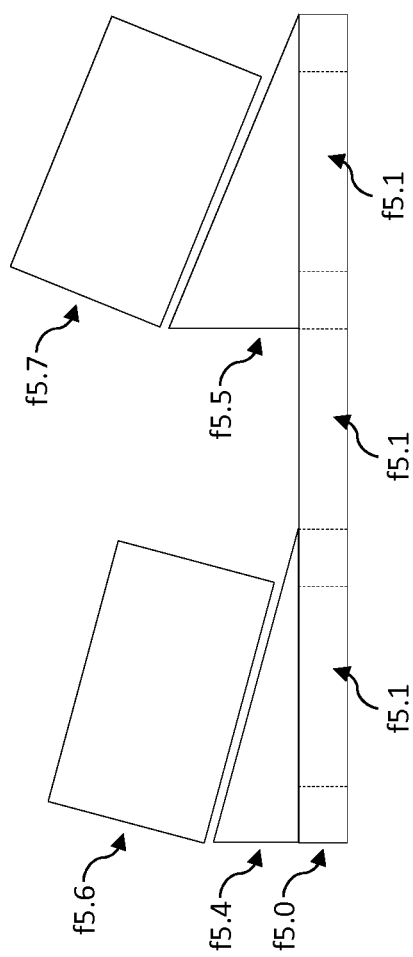
Figure 6.5a

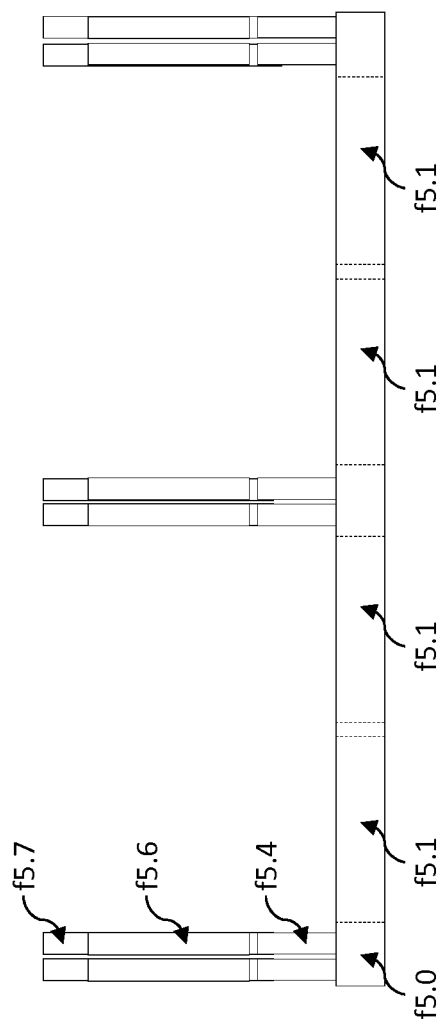
Figure 6.5b

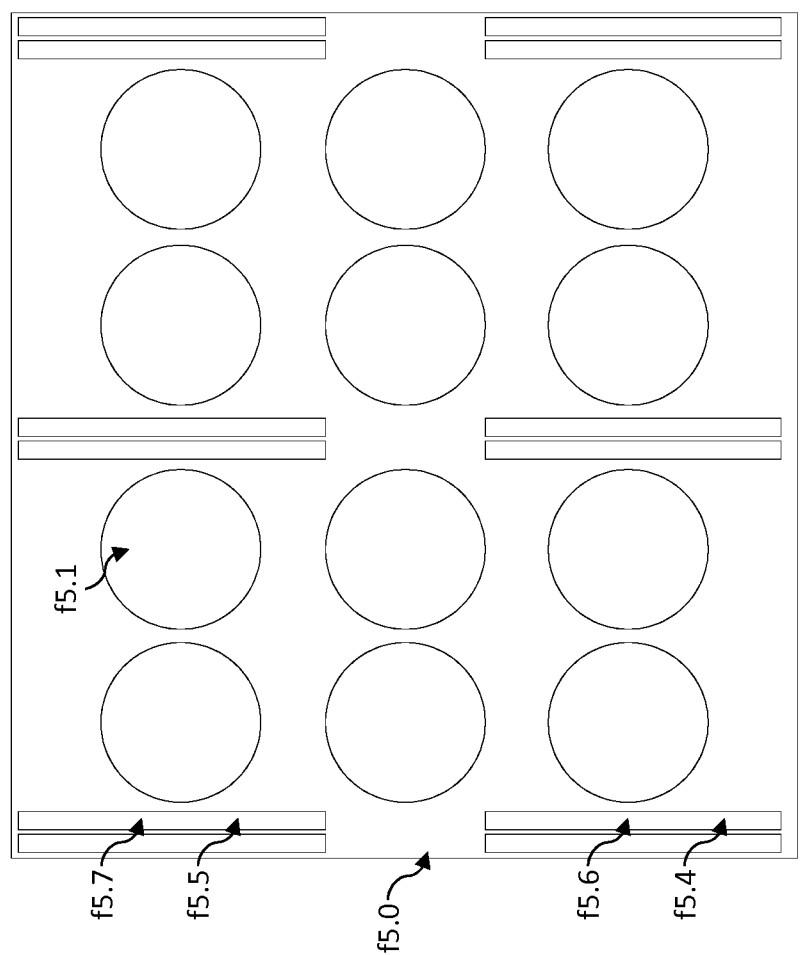
Figure 6.5c

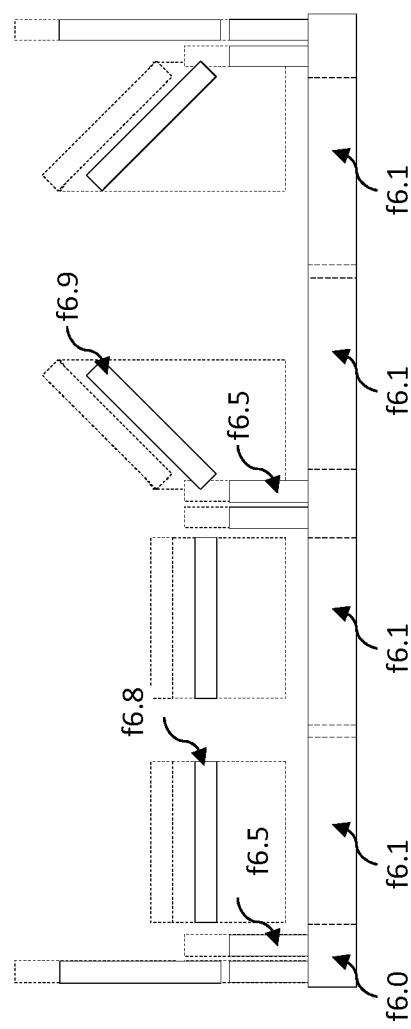
Figure 6.6

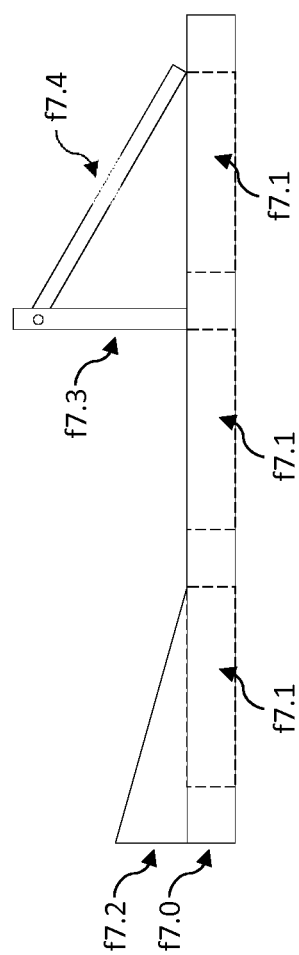
Figure 6.7a

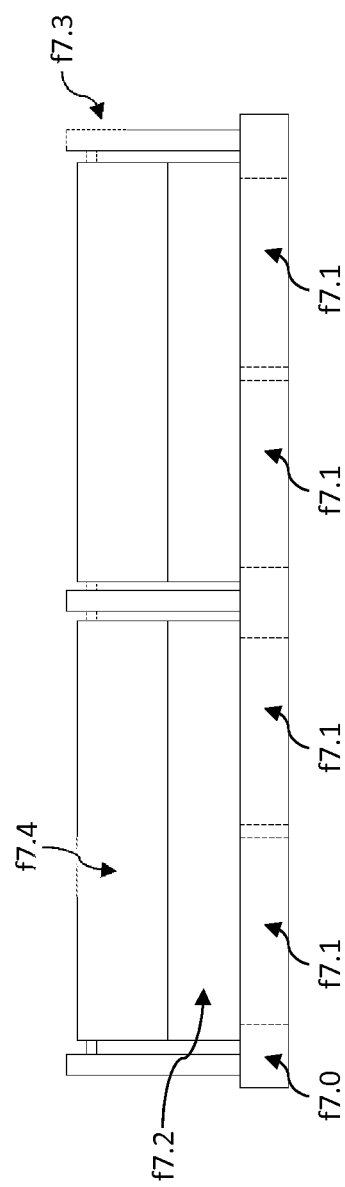
Figure 6.7b

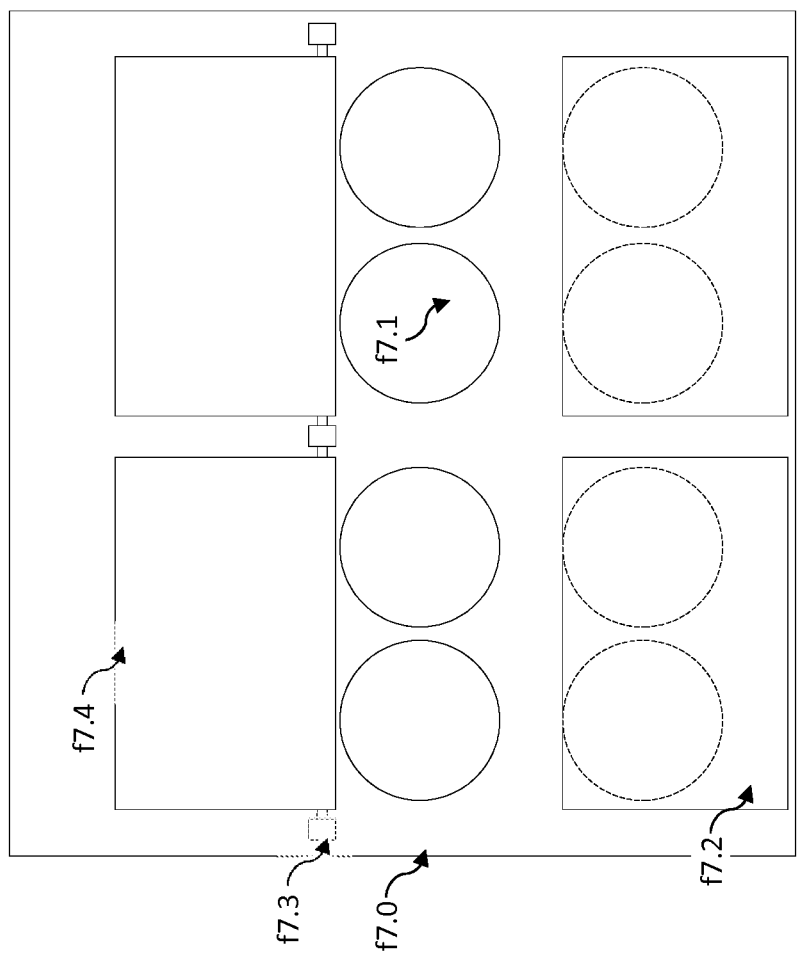
Figure 6.7c

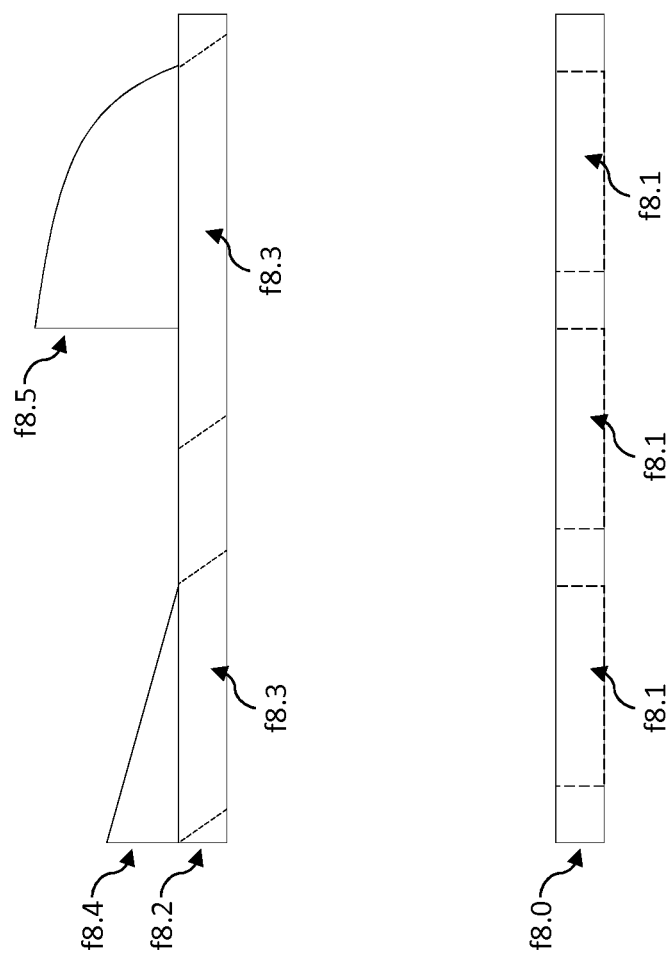
Figure 6.8a

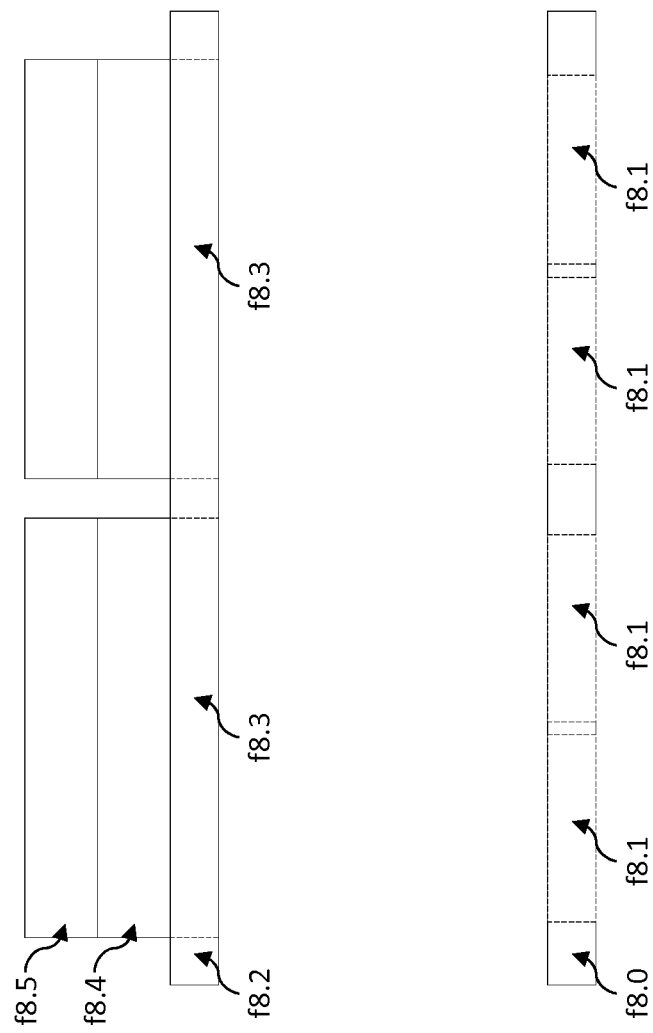
Figure 6.8b

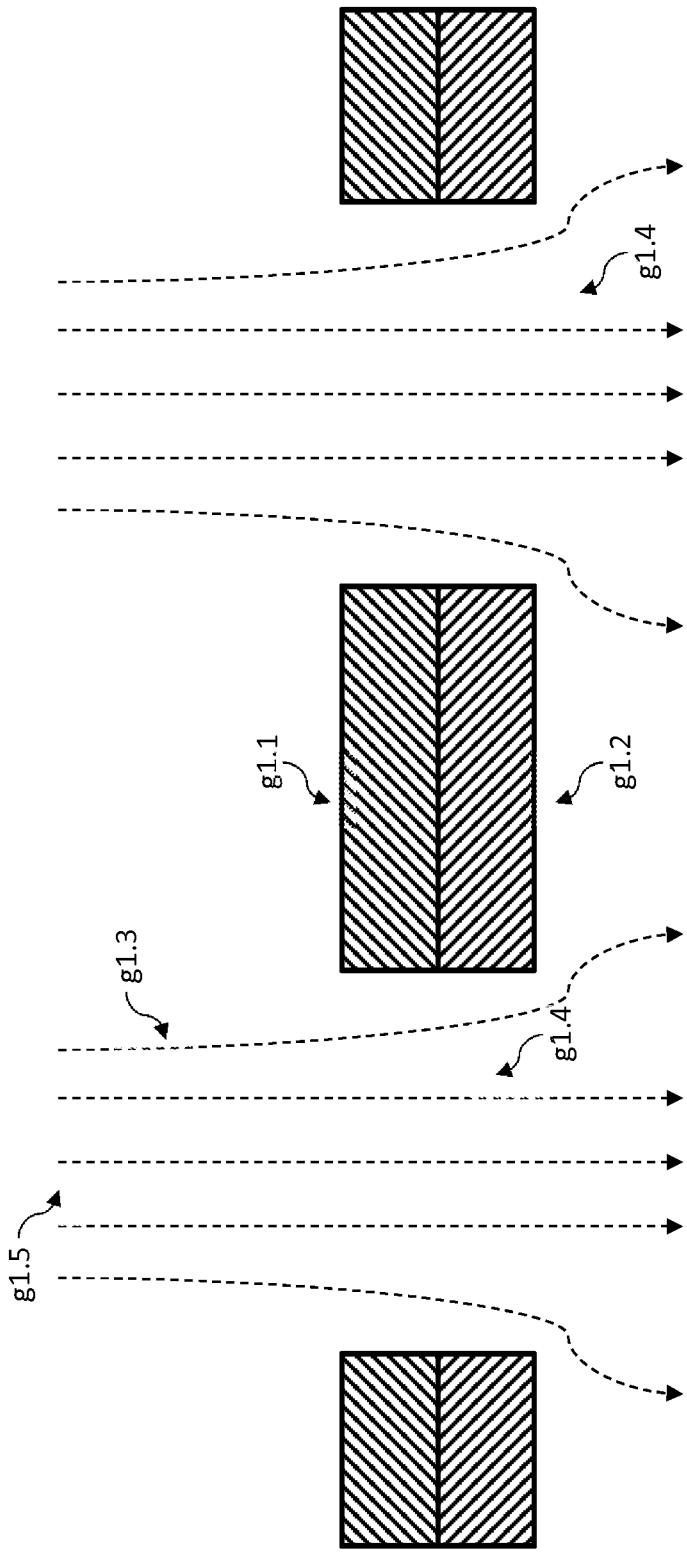
Figure 7.1

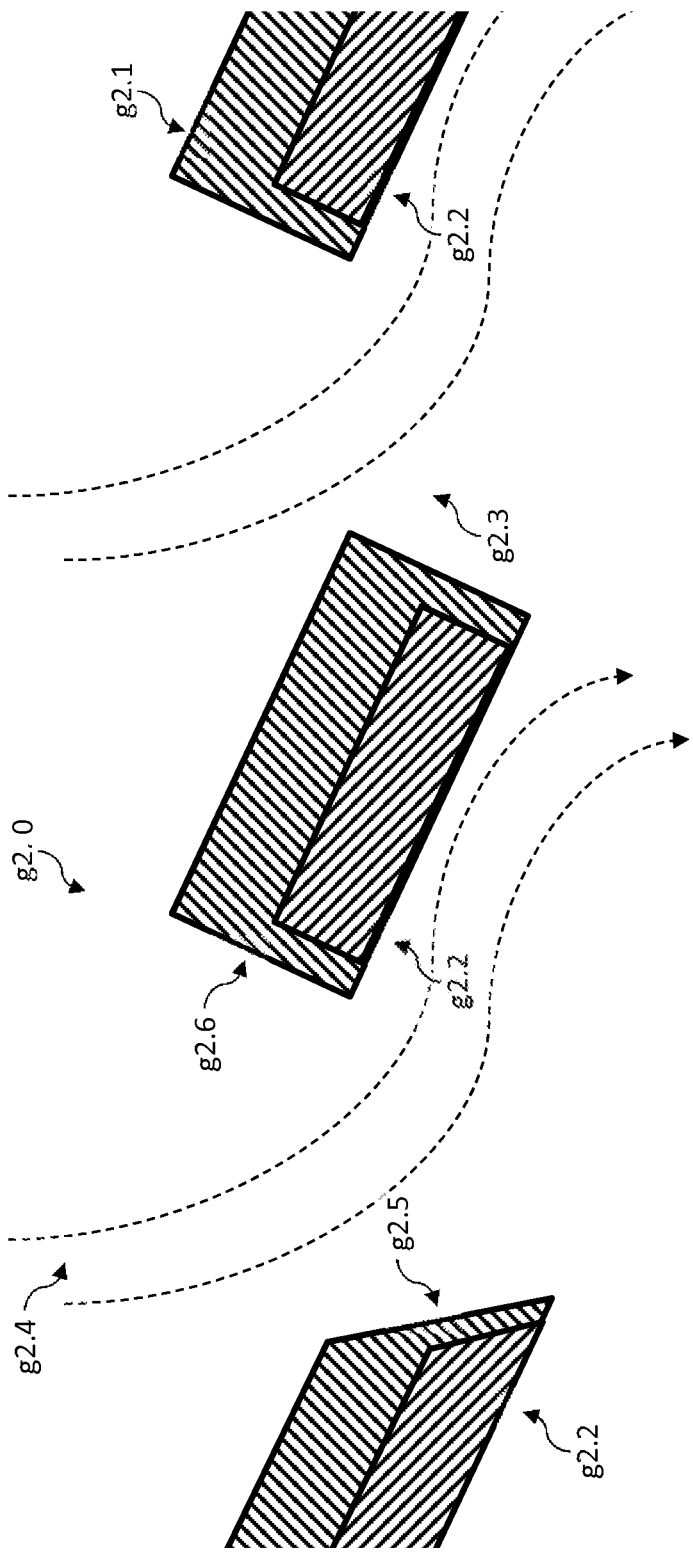
Figure 7.2

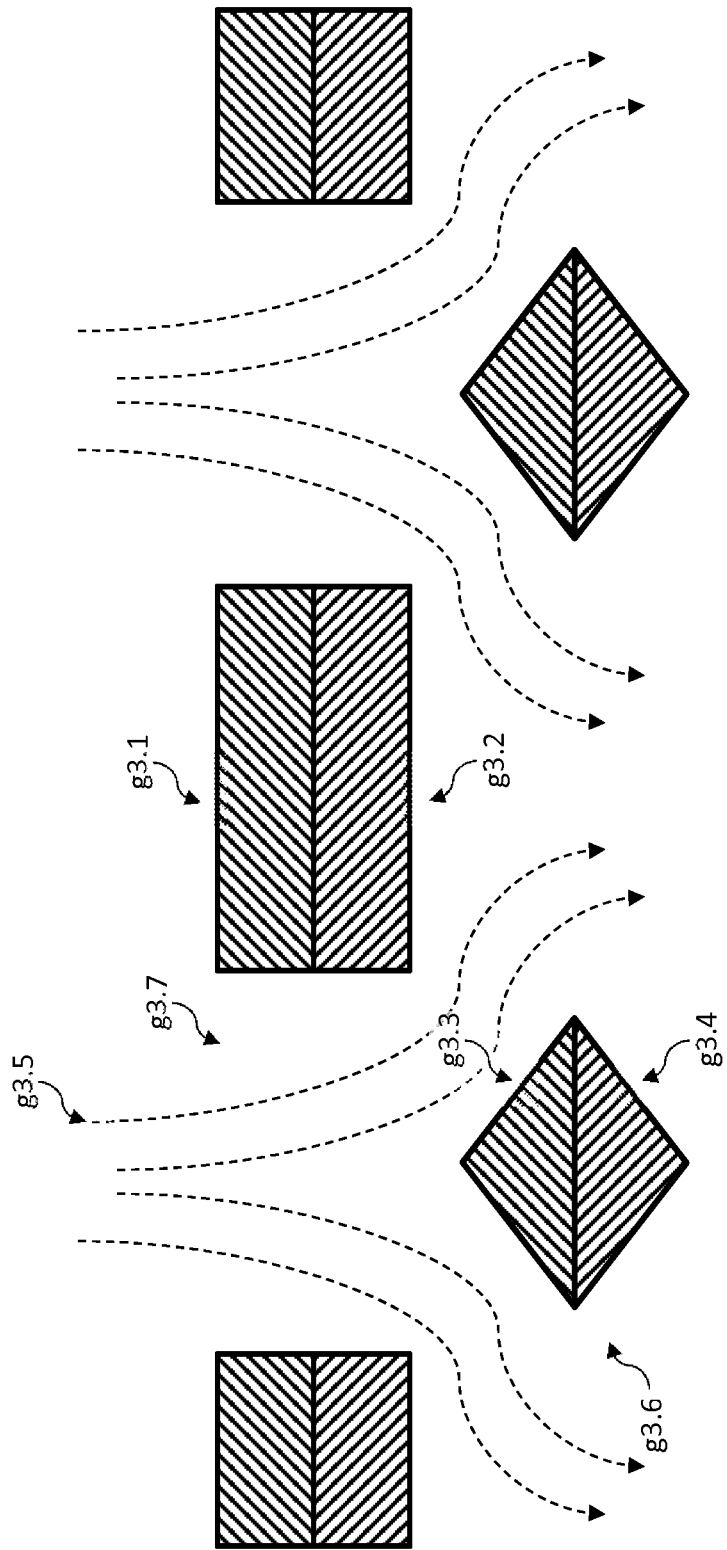
Figure 7.3

MICRO THRUSTER USES AND IMPROVEMENTS

TECHNICAL FIELD

These inventions relate to optimizations of micro thruster propulsion systems, laminar flow control systems and optimizations of micro-scale thermal transfer systems.

BACKGROUND OF INVENTION

Devices for the movement of gases are widely utilized. The very first aircraft engines were piston driven propellers. They worked by coupling a piston engine to a propeller. This simplicity led to widespread adoption until jet engines were invented. Turbojet engines work by the principle of coupling a turbine to a fuel combination system. Spinning of the turbine compresses a fuel-air mixture which, when burned, provides thrust and torque to rotate the turbine. The first turbojet engines derived their thrust from exhaust leaving the engines. Modern variants of the turbojet engines include turbo prop and turbofan engines, which use torque generated by the exhaust to drive a propeller or fan in addition to compressing the fuel-air mixture. Rocket engines are possibly one of the oldest mechanical propulsion systems, and have not changed much since their inception. A rocket comprises a tube or cone in which sits (or into which is fed) a fuel oxidizer mixture. Expanding gas from combustion of this mixture creates thrust. Rockets, while offering the highest fuel-thrust ratio of any existing propulsion systems, cannot easily vary the amount of thrust they generate. Even adding an ability to turn a rocket on or off significantly complicates its design.

The ability of a temperature differential to drive gas flow at a surface has long been known. In 1873, Sir William Crookes developed a radiometer for measuring radiant energy of heat and light. Today, Crookes's radiometer is often sold as a novelty in museum stores. It consists of four vanes, each of which is blackened on one side and light on the other. These are attached to a rotor that can turn with very little friction. The mechanism is encased inside a clear glass bulb with most, but not all, of the air removed. When light falls on the vanes, the vanes turn with the black surfaces apparently being pushed by the light.

Crookes initially explained that light radiation caused a pressure on the black sides to turn the vanes. His paper was originally supported by James Clerk Maxwell, who accepted the explanation as it seemed to agree with his theories of electromagnetism. However, light falling on the black side of the vanes is absorbed, while light falling on the silver side is reflected. This would put twice as much radiation pressure on the light side as on the black, meaning that the mill is turning the wrong way for Crooke's initial explanation to be correct. Other incorrect explanations were subsequently proposed, some of which persist today. One suggestion was that the gas in the bulb would be heated more by radiation absorbed on the black side than the light side. The pressure of the warmer gas was proposed to push the dark side of the vanes. However, after a more thorough analysis Maxwell showed that there could be no net force from this effect, just a steady flow of heat across the vanes.

The correct explanation for the action of Crookes radiometer derives from work that Osborne Reynolds submitted to the Royal Society in early 1879. He described the flow of gas through porous plates caused by a temperature difference on opposing sides of the plates which he called "thermal transpiration." Gas at uniform pressure flows through a porous plate from cold to hot. If the plates cannot move, equilibrium is reached when the ratio of pressures on either side is the square root of the ratio of absolute temperatures.

Reynolds' paper also discussed Crookes radiometer. Consider the edges of the radiometer vanes. The edge of the warmer side imparts a higher force to obliquely striking gas molecules than the cold edge. This effect causes gas to move across the temperature gradient at the edge surface. The vane moves away from the heated gas and towards the cooler gas, with the gas passing around the edge of the vanes in the opposite direction. Maxwell also referred to Reynolds' paper, which prompted him to write his own paper, "On stresses in rarefied gases arising from inequalities of temperature." Maxwell's paper, which both credited and criticized Reynolds, was published in the Philosophical Transactions of the Royal Society in late 1879, appearing prior to the publication of Reynolds' paper. See, Philip Gibbs in "The Physics and Relativity FAQ," 2006, at math.ucr.edu/home/baez/physics/General/LightMill/light-mill.html.

Despite the descriptions by Reynolds and Maxwell of thermally driven gas flow on a surface dating from the late 19th century, the potential for movement of gases by interaction with hot and cold surfaces has not been fully realized. Operation of a Crookes radiometer requires rarefied gas (i.e., a gas whose pressure is much less than atmospheric pressure), and the flow of gas through porous plates does not yield usable thrust, partially due to the thickness and due to the random arrangement of pores in the porous plates.

Thermal transpiration refers generally to the formation of a pressure gradient in gas inside a tube, the pressure gradient formed when there is a temperature gradient in the gas inside the tube, and when the mean free path of the molecules in the gas is a significant fraction of the tube diameter.

Construction of a thermal transpiration device to operate at 1 ATM (standard atmosphere pressure) is difficult as, optimally, the hot and cold sides must be within 100 nm or less of each other. A 100 nm thick film exposed to an unfiltered, uncontrolled environment tends to be too fragile to withstand typical environmental stresses, such as, for example, impact from debris and/or handle the sheer forces produced by changes in air current.

Furthermore, the only insulation that is generally efficient at that scale is a vacuum. This means that that if the Bernoulli effect is used to draw a vacuum between the two membranes, at least one of the membranes used to form the thermal transpiration device must be thinner than 50 nm. Such a thin membrane would not last long due to the typical environmental stresses placed on the device when in use.

Thus there is a need for a way to optimize the thermal transpiration/radiometric effect described above for practical uses.

SUMMARY OF INVENTION

Apparatuses and methods to optimize the thermal transpiration and radiometric effect are described herein. Several inventions address optimizations applicable to individual thrusters which may or may not be part of a larger collection. This includes novel systems and methods of maintaining the multiple volumes of gases in close proximity (<0.1 Knudsen Number (Kn)) at different temperatures as well as maximizing the difference in temperatures between the multiple volumes, given a surface temperature and the surfaces' corresponding energy accommodation coefficient and/or surface to gas convection coefficient. Several more inventions address optimizations applicable to a collection of thrusters. These inventions include systems and methods optimizing gas flows to the intakes, as well as optimizing the gas flows through the thrusters in a way that increases the net force. Another invention addresses a system and methods for decreasing energy requirements by integrating a photovoltaic/thermoelectric generator to convert solar energy into electrical energy for use by the aircraft. The last of the inventions are for practical applications for the NMSET technology. A Laminar flow control system and apparatus and a system and methods for characterizing the speed of heat conduction through a given material.

The present inventions optimize devices that benefit from the thermal transpiration/radiometric effect. They also describe practical applications and describe a system and methods to decrease energy requirements by making use of the membrane to collect and convert solar energy.

Overview

In preferred embodiments, the apparatus described here may be referred to as Networked Micro Scale Electric Thrusters (NMSet). The basis of operation of the NMSet makes it possible to apply an NMSet in the fields of propulsion, adhesion, and refrigeration; depending on the manner in which an NMSet is employed. In preferred embodiments, NMSets and related devices provide lightweight, compact, energy-efficient creation of a gas pressure differential with adjustable flow velocity.

Principles of Operation

Although many different geometries of NMSet devices are possible, the principle of operation of NMSets remains the same. Operation of an NMSet uses energy to lower entropy on some device surfaces and transfer lowered entropy to a gas in contact with the surface. The device can optionally donate energy to the gas by raising the gas temperature. The function of the NMSet may be therefore divided into three areas:

the means by which entropy on surfaces of the device is lowered;
the means by which the lowered entropy is transferred to the gas; and
the optional means by which the gas temperature is increased Kinetic Force Inequality As shown in FIG. 5.1, The Momentum Flux Imbalance is the primary force component of a thermal transpiration/radiometric device. This is an area affect and is caused by a surface e1.4 transferring more thermal energy to the surrounding gas e1.6 and therefore resulting in a higher kinetic force on the surface, and the opposing surface e1.3 transferring less thermal energy to the surrounding gas e1.5 and therefore experience less kinetic force on the surface. There is no non-local pressure gradient as an open system is mostly isobaric, as any increase in pressure is quickly dissipated with distance. This is different from an isochoric system, where at a starting pressure of 1 atm, pressure would change by 0.05 psi per degree Kelvin.

Kinetic force inequality can be achieved by maintaining the two surfaces at different temperatures. However in an isobaric system, with sufficient gas flows, a kinetic force inequality can also be achieved if the two surfaces have a different energy accommodation coefficient ("EAC"). EAC is a measure of the average efficiency of the energy exchange per encounter of a gas molecule with the solid at the gas-solid interface. This causes a gas impinging on the surface with a higher EAC to gain energy faster, while the gas impinging on the surface with a lower EAC gains energy slower.

Local Density Inequality

Most literature refers to Density Imbalance as thermal creep or thermal transpiration. However, while this force is observed in the transitional/slip flow regime, this is not an exotic force or one limited to the transitional/slip flow regime; instead this is a simple and fundamental force. In an isobaric system, when the temperature of the gas changes, to preserve pressure, density decreases, when it cools, to preserve pressure, density increases. In an isobaric system you have two separate volumes of gas at the same pressure, however at different temperature and densities. If the barrier separating the two volumes is removed, the densities and temperatures will equalize. Since there is more cold/denser gas than there is hot/rarer gas, density will equalize faster than the temperature and the gas will flow from cold to hot at a rate related to the diffusion coefficient, the concentration gradient and the distance as it relates to the mean free path.

The limit of a force on a heated plate in an isochoric system that started at ambient pressure and temperature is equal to the pressure produced by the temperature difference between ambient and that of the heated plate. Then the limit of the force generated by a radiometric device is equal to half the pressure produced by the temperature gradient. A 1 $m^2$ membrane operating at 1 atm with ideal materials, aperture size, packing and optimizations is limited to 172.8 N per degree K. This is further relaxed by ratio of aperture area to surface area. Therefore if is 10 $\mu m^2$ of aperture area per 40 $\mu m^2$ of surface area (apertures account for 25% of the membrane surface), the limit of force will be reduced by 25%.

Applications

Propulsion

In some embodiments, NMSet can offer one or more of the following improvements in the field of propulsion:

1. Improved Resiliency: Damage to any area in a conventional propulsion system can lead to system-wide failure. NMSet provides enhanced redundancy and robustness.
2. Lightweight: NMSet does not need a particular fuel, and itself can be microns thick. With the right setup, fuel load vanishes and membrane weight is immaterial.
3. Scalability: Conventional propulsion systems cannot scale easily; optimal turbojets for small aircrafts are not scale reductions of optimal turbojets for large aircrafts. However, such scalability issues are not present with NMSet.
4. Response Time: Thrust from NMSet can be easily and quickly adjusted in response to changes of need.
5. Power Independence: Conventional propulsion systems require a specific type or class of fuels in order to operate, whereas NMSet only requires a source of temperature differential, which can established by electricity.
6. Green Propulsion: Because NMSet does not have to rely on fossil fuels to operate, it can be setup to not produce polluting exhaust (e.g., carbon monoxide, nitrogen oxide) during ordinary operation.

Adhesion

In some embodiments, an NMSet device may be used as a lightweight mechanical adhesive. The process can be reversible as the only step required to reverse the adhesion is to cut power to the NMSet. Using NMSet can provide further benefit over electrostatic adhesion in that NMSet does not require a material to be adhered to be flat or conductive surface. Compared to other mechanical adhesion processes, using NMSet may not require a surface being adhered to be pretreated.

Gas Compression

Because an NMSet device can be arranged to drive gas flow through a surface, all or part of a pressurized vessel may function to provide gas compression. Thus, in some arrangements, separated pumping and pressurized containment may not be required. Moreover, because, NMSet's action generally occurs over a short distance, it is possible, in some embodiments, to use NMSet as a highly compact compressor by stacking multiple stages of NMSets. Conventional propulsion systems generally operate over length scales of centimeters and sometimes meters. Thus, stacking conventional propulsion systems tends to be a complex and expensive proposition. By contrast, an NMSet can operate over micrometers. Furthermore, the versatility of an NMSet means that an NMSet can be readily adapted to function as a high-pressure pump, a standard atmospheric pump, or with a sufficient number of stages, as a high vacuum pump.

Laminar Flow Control System

As shown in FIG. 4.1, traditional aircraft use engines to produce forward thrust and then utilize the wings d1.1 to produce vertical lift. Air flows over the wings d1.2 remain laminar until boundary layer separation occurs and turbulent flows result in section d1.3. As illustrated in FIG. 4.2, it is well known in the art that a wing d2.1 with suction intake will prevent boundary layer separation from occurring until the air flow is toward the end of the wing at d2.3. Installing NMSET or related device d2.4 so that air flows through housing in the wing d2.1, and through an exhaust d2.5 which is located on the body of the aircraft, preferably the bottom or end of the wing d2.1. Current laminar flow solutions are bulky, often require major redesign of the aircraft's wings and sometimes the body. NMSET or related devices are easier to integrate into a wing surface, while providing the necessary suction to maintain a laminar flow for longer distances d2.2.

Temperature Gradients

Temperature Gradients are generally required for NMSET or related devices to operate. Temperature increase of a hot side of a device is desired as long as the structures do not negatively affect the isobaric dynamics of the system.

BRIEF DESCRIPTION OF THE DRAWINGS

The present invention will now be described with reference to the accompanying drawings, in which:

FIG. 3.1 shows a cross section of a thermal transpiration/radiometric device made with a heated film whose surfaces have different energy accommodation coefficients/surface to gas convection coefficients.

FIG. 3.1a shows a cross section of another thermal transpiration/radiometric device made with a heated film whose surfaces have different energy accommodation coefficients/surface to gas convection coefficients.

FIG. 3.2 shows a cross section of a thermal transpiration/radiometric device made with a thermoelectric/peltier or other dual temperature film whose surfaces have different energy accommodation coefficients/surface to gas convection coefficients. This design is best suited for films where the cooler surface is of a higher temperature than the ambient gas.

FIGS. 3.2a and 3.2b show cross sections of another thermal transpiration/radiometric devices made with a thermoelectric/peltier or other dual temperature film whose surfaces have different energy accommodation coefficients/surface to gas convection coefficients.

FIG. 3.3 shows a cross section of a thermal transpiration/radiometric device made with a thermoelectric/peltier or other dual temperature film whose surfaces have different energy accommodation coefficients/surface to gas convection coefficients. This design is best suited for films where the cooler surface is of a lower temperature than the ambient gas.

FIG. 3.3a shows a cross section of a thermal transpiration/radiometric device made with a thermoelectric/peltier or other dual temperature film whose surfaces have different energy accommodation coefficients/surface to gas convection coefficients. This design is best suited for films where the cooler surface is of a lower temperature than the ambient gas.

FIG. 3.3b shows a cross section of a thermal transpiration/radiometric device made with a thermoelectric/pettier or other dual temperature film whose surfaces have different energy accommodation coefficients/surface to gas convection coefficients. This design is best suited for films where the cooler surface is of a lower temperature than the ambient gas.

FIG. 4.1 shows a cross section of a wing with boundary layer separation and turbulent flows over the top of the wing.

FIG. 4.2 shows a cross section of a wing with the top skin incorporating microthrusters such as NMSET to maintain the boundary layer further toward the end of the wing.

FIG. 5.1 shows a cross section of a single thermal transpiration/radiometric device without geometric enhancements.

FIG. 5.2 shows a cross section of another single thermal transpiration/radiometric device with geometric enhancements.

FIG. 5.3 shows a cross section of yet another single thermal transpiration/radiometric device with geometric enhancements and energy accommodation coefficients/surface to gas convection coefficients enhancements.

FIG. 6.1 shows a cross section of a device with a microthruster system perpendicular to the direction of travel, and the resultant air flows.

FIG. 6.2 shows a cross section of a device with a microthruster system parallel to the direction of travel, and the resultant air flows.

FIG. 6.3 shows a cross section of a device with a microthruster system at an angle to the direction of travel, and the resultant air flows.

FIG. 6.4 shows a cross section of a device with a scoop in over the microthruster system that is parallel to the direction of travel, and the resultant air flows.

FIG. 6.5a shows a side view of a movable flap system designed to channel air flow through the microthruster assembly.

FIG. 6.5b shows a front view of the movable flap system of FIG. 6.5a.

FIG. 6.5c shows a top view of the moveable flap system of FIG. 6.5a.

FIG. 6.6 shows a front view of an actuated movable flap system designed to channel air flow through the microthruster assembly.

FIG. 6.7*a* shows a side view of a fixed flap system designed to channel air flow through the microthruster assembly.

FIG. 6.7*b* shows a front view of the fixed flap system of FIG. 6.7*a*.

FIG. 6.7*c* shows a top view of the fixed flap system of FIG. 6.7*a*.

FIG. 6.8*a* shows a side and front view of a fixed flap system designed to channel air flow through the microthruster assembly.

FIG. 6.8*b* shows a front view of the fixed flap system of FIG. 6.8*a*.

FIG. 7.1 shows a cross section of multiple thermal transpiration/radiometric thrusters in operation and the resultant airflows.

FIG. 7.2 shows a cross section of multiple thermal transpiration/radiometric thrusters in operation and the resultant airflows being shaped by a secondary layer.

FIG. 7.3 shows a cross section of multiple thermal transpiration/radiometric thrusters, at an angle to each other, in operation and the resultant airflows.

DETAILED DESCRIPTION

Figure 1:
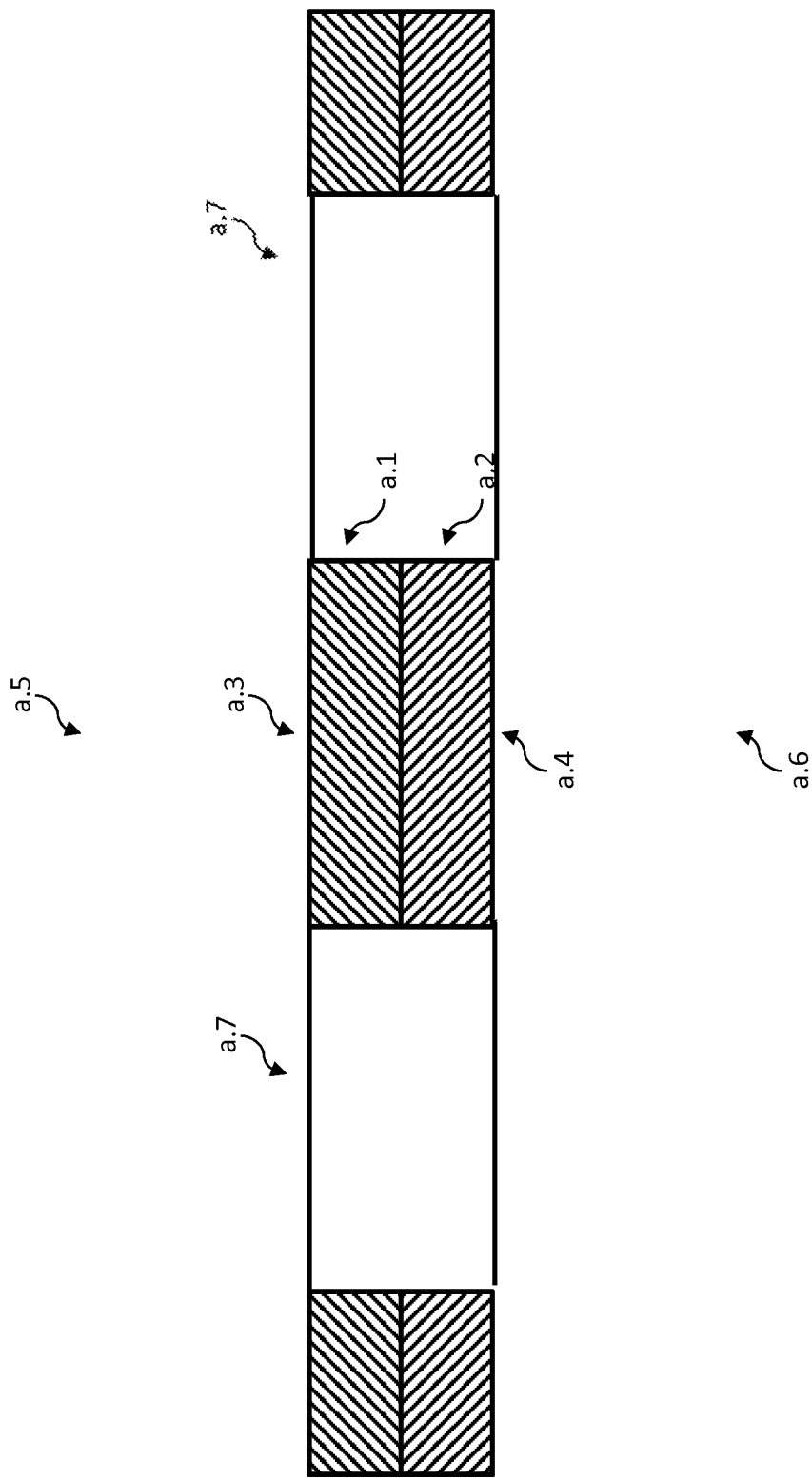
FIG. 1 shows a cross section of a thermal transpiration/radiometric device with multiple apertures.

FIG. 1 illustrates a simple NMSET membrane, microthruster, or thrust generating membrane. The membrane is made of two materials shown by a.1 and a.2. These materials form two surfaces, a cooler surface a.3 and a warmer surface a.4. Apertures a.7 are located in the membrane to connect the cooler gas a.5 with the warmer gas a.6. For NMSET to function, a.5 must be a different temperature than a.6. In preferred embodiments described herein, a temperature differential can be established in a solid-state electrodynamic mechanism. However, the devices and methods described here are not limited to electronic or purely solid state devices. For example, a temperature differential may be established by conduction of heat from combustion using a fluid coolant, exothermic chemical reaction, or other chemical source. A temperature differential may be established by simple resistive heating, by the Peltier effect, by the thermotunneling enhanced Peltier effect, thermionic emission or by any other suitable means, such as explained below. The effectiveness of NMSET and related devices is depended on establishing the largest possible temperature gradient between the two volumes of gas a.5 and a.6.

Non Uniform Thermal Conductivity

As the NMSet device is made thinner, in many cases it becomes increasing difficult to maintain desired temperature gradients. An improved method of establishing a temperature gradient between two volumes of gas is illustrated in FIG. 3.1 and described herein. When heated, a single membrane c1.8 would transfer thermal energy to the gas c1.5 on one side of the device c1.13 and the gas c1.6 on the other side of the device c1.13 equally, without a temperature or density gradient.

However if the thermal energy imparted per collision with surface c1.3 is different from surface c1.4, the volumes of gas c1.5 and c1.6 will heat at different rates. While the heating rates are dependent on flow rates through aperture c1.7, if sufficiently high temperatures are generated by the membrane c1.8, and sufficient difference in EACs between surface c1.3 and c1.4 exists, a temperature/density gradient will appear between gas volume c1.5 and c1.6.

The temperature gradient is due to an imbalance in energy transferred from surface to gas between the two materials c1.3 and c1.4. This energy imbalance significantly relaxes design and development constraints when manufacturing NMSets for higher pressures.

In FIG. 3.1 the membrane c1.8 is covered with another material c1.1 such as molybdenum or other material with a low EAC. This material can be further optimized if smooth or polished, as this decreases the available surface area for energy transfer to the gas. Material c1.2 covers the other side of membrane c1.8. This material c1.2 can be copper, oxygen implanted tungsten or other material with a higher EAC. This material can be further optimized if the surface is rough or a geometry is chosen to increase the overall surface area of c1.4.

In another embodiment shown in FIG. 3.1*a*, if the EAC of the heated membrane c1.10 of the device c1.14 is sufficiently high, a material c1.9 with lower EAC is what is required. Similarly, if the EAC of the heated membrane c1.10 is sufficiently low, a material c1.9 with higher EAC is required.

Additionally, as shown in FIG. 3.2, a heated membrane c2.16 with a hot side c2.14 and a hotter side c2.8 will benefit if a material with a lower EAC c2.1 covers the hot side c2.14, so that the surface c2.3 transfers less thermal energy to the ambient gas c2.5. A material with a higher EAC c2.2 covers the hotter side c2.8, so that the surface c2.4 transfers more thermal energy to the ambient gas c2.6. This will increase the flow rate through aperture c2.7.

As another example shown in FIG. 3.2*a*, when the EAC of the hotter surface c2.10 is sufficiently high, and only a material c2.9 with lower EAC is necessary to cover the hot side c2.13 to lower the thermal energy transferred to the ambient air. Further, as can be seen in FIG. 3.2*b*, when the EAC of the hot side c2.15 is sufficiently low, only a material with a higher EAC c2.12 is necessary to cover the hotter side c2.11.

Additional benefit can be achieved by a membrane where the temperature gradient is achieved by peltier, thermionic emission or other active heating/cooling method. For example, as shown in FIG. 3.3, where the hot material c3.8 is hotter than the ambient gas and the cool material c3.14 is cooler than the ambient gas it is more advantageous to cover the cool material c3.14 with a material of a higher EAC c3.1 so that the cool surface c3.3 will more efficient in cooling the ambient gas c3.5. It is also advantageous to cover the hot material c3.8 with another material with a higher EAC c3.2, so that the hot surface c3.4 will more efficient transfer thermal energy to the ambient gas c3.6. This will increase the flow rate through apertures c3.7.

As another example shown in FIG. 3.3*a*, if the EAC of the hotter surface c3.10 is sufficiently high, and only a material c3.9 with higher EAC is necessary to cover the cool side c3.13 so that the cool surface will be more efficient at cooling the ambient air. Additionally, as shown in FIG. 3.3*b*, when the EAC of the cool side c3.15 is sufficiently high, and only a material with a higher energy coefficient c3.12 is necessary to cover the hotter side c3.11.

Surface Geometry Optimizations

A simple NMSet is illustrated in FIG. 5.1. This figure provides an illustration of the edge effects that take places with an NMSet. Other apertures and a planar sheet are not shown, but the effects illustrated herein will take place at all NMSets in a group, which may make a set of microthrusters.

The cooler side e1.1 is stacked on the hotter side e1.2. As in previously discussed, an NMSet operates by transferring more heat from the hotter surface e1.4 to the ambient gas e1.6, than the cooler surface e1.3 transfers to the ambient gas e1.5. Because the device operates as an isobaric system, the gas near the hotter surface e1.4 is less dense than the gas near the cooler surface e1.3. In the aperture, or around the edge of the membrane e1.14, less dense gas e1.6 diffuses into higher density gas e1.5. As the gases diffuse into each other, the hotter gas will gain density and the cooler gas will lose density. This process creates the flow of gas particles from cold to hot.

Density imbalances are greatest at the boundary layer e1.15, and decrease with distance, illustrated as rings e1.10, e1.11, e1.12, and e1.13. Diffusive flux decreases with the concentration gradient and distance as it relates to the mean free path. Therefore such a system will have a maximum effective radius at e1.13. In a large structure, only part of the hotter e1.8 and cooler e1.7 surface is effective. Furthermore, due to mass flow resultant from diffusion, these gas particle interactions near the wall e1.9 generate a parasitic force in the direction of cold to hot.

FIGS. 5.2 and 5.3 illustrate ways to improve the force generated by an NMSet shown in FIG. 5.1. The membrane e2.10 in FIG. 5.2 has a surface e2.2 made of a material A that is hotter than surface e2.1, which is made of material B. At the edge, the maximum effective area is shown by radius e2.7. Effective surface area for the cooler section e2.3 is shown without modifications. If the cooler section e2.3 is warmer than ambient air, the cooler section should be as smooth/polished as possible to minimize heat transfer to the gas.

It is preferable for the hotter section e2.4 to transfer as much heat energy as possible. A sloped geometry helps maximize the surface area near the boundary layer e2.9, where the rate of diffusion [of gas particles] is the highest. The geometry [of the hotter section] can also be curved as illustrated by e2.6, and/or rough, to further maximize surface area to exchange thermal energy with the ambient gas.

Furthermore, when the temperature gradients are driven by active heating/cooling and the cooler side is cooler than ambient gas, it is preferable for the cooler side to exhibit the same characteristics as the hotter side. A minimal sidewall e2.5 is preferable to minimize resistance with high density gas as it flows from cold to hot. An optimal sidewall e2.8 is only limited by structural integrity of the material.

FIG. 5.3 further illustrates another embodiment of the invention, similar to that shown in FIG. 5.2, with a single resistive membrane e3.6 and a low energy accommodation film e3.5 over the cooler side of the membrane. Similar principles apply as with FIG. 5.2. If the temperature of the section e3.1 is higher than ambient gas, and it is cooler than the opposite surface, low energy accommodation film and/or smooth/polished surfaces are preferred as they minimize heat transfer to the ambient gas. If the temperature of the surface is lower than ambient gas, or the temperature of the surface is the hotter surface e3.2, e3.3, then surface area of e3.2 and/or e3.3 should be maximized and higher energy accommodations films should be used. As with FIG. 5.2, a minimal section e3.4 is preferable so that resistance with a high density gas is minimized as it flows from cold to hot.

Energy Utilization

Some implementations of NMSets will require a power source to drive temperature gradients. Depending on the pressure they are operating in, the payload carried, current velocity, and other factors, the power load changes. Furthermore, in some applications a large portion of NMSET may be exposed to atmosphere and sunlight.

Figure 2:
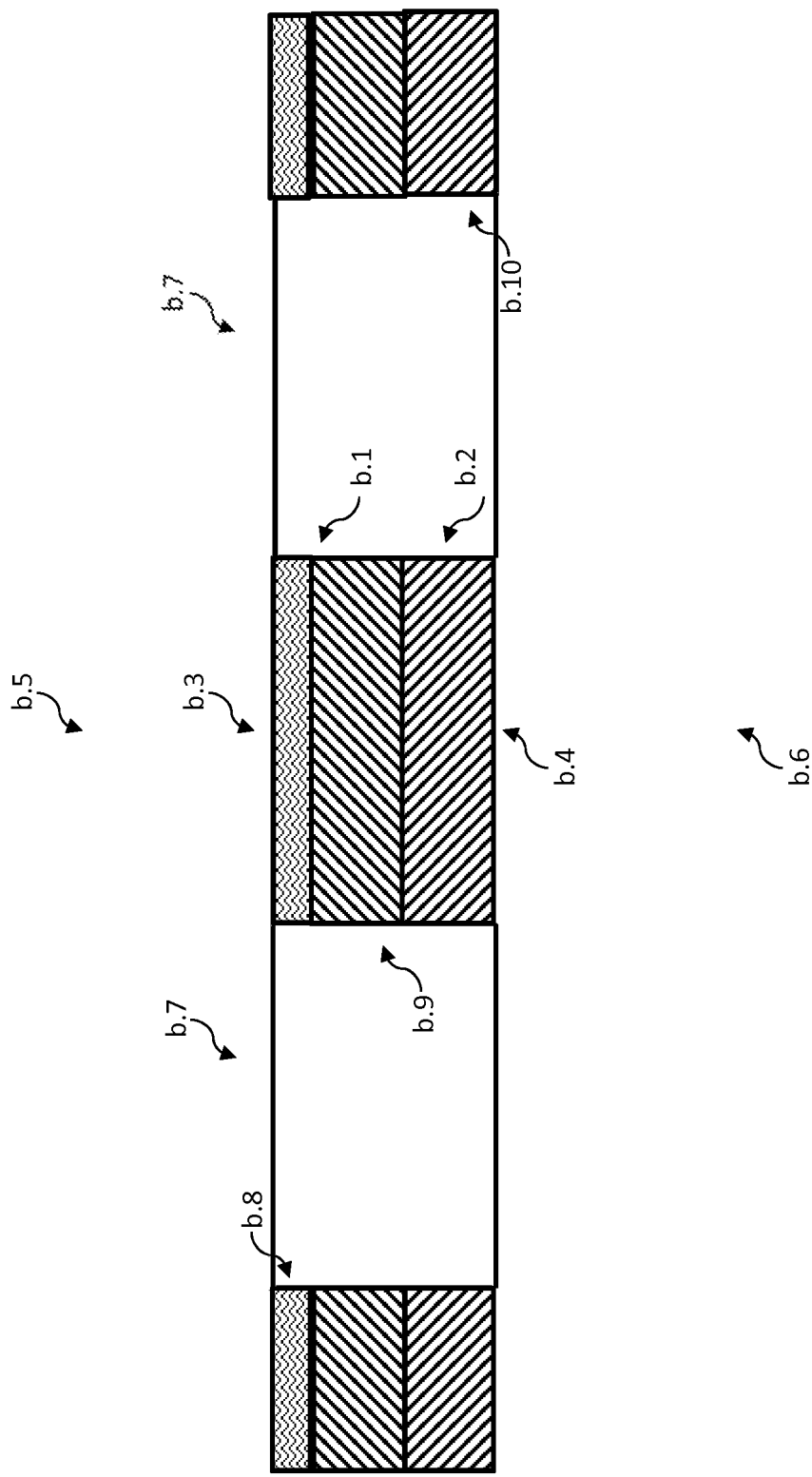
FIG. 2 shows a cross section of a thermal transpiration/radiometric device with a photovoltaic/thermoelectric component.

FIG. 2 illustrates an NMSet with a photovoltaic membrane designed as a supplementary power source, which may also be referred to as a power generating membrane. In this diagram, a cooler layer b.1 and a hotter layer b.2 are in a stack. The surface of the cooler layer b.3 is cooling the ambient gas b.5, while the surface of the hotter layer b.4 is heating the ambient gas b.6. During normal operation, the cool side is exposed to the sun and the photovoltaic membrane b.8 would be placed on top of cooler surface to collect solar energy. The solar energy is fed back into the system for use or storage. Placement on the top surface may be undesirable for multiple reasons, including little to no damage resistance, undesirable energy accommodation profile and others.

Figure 2A:
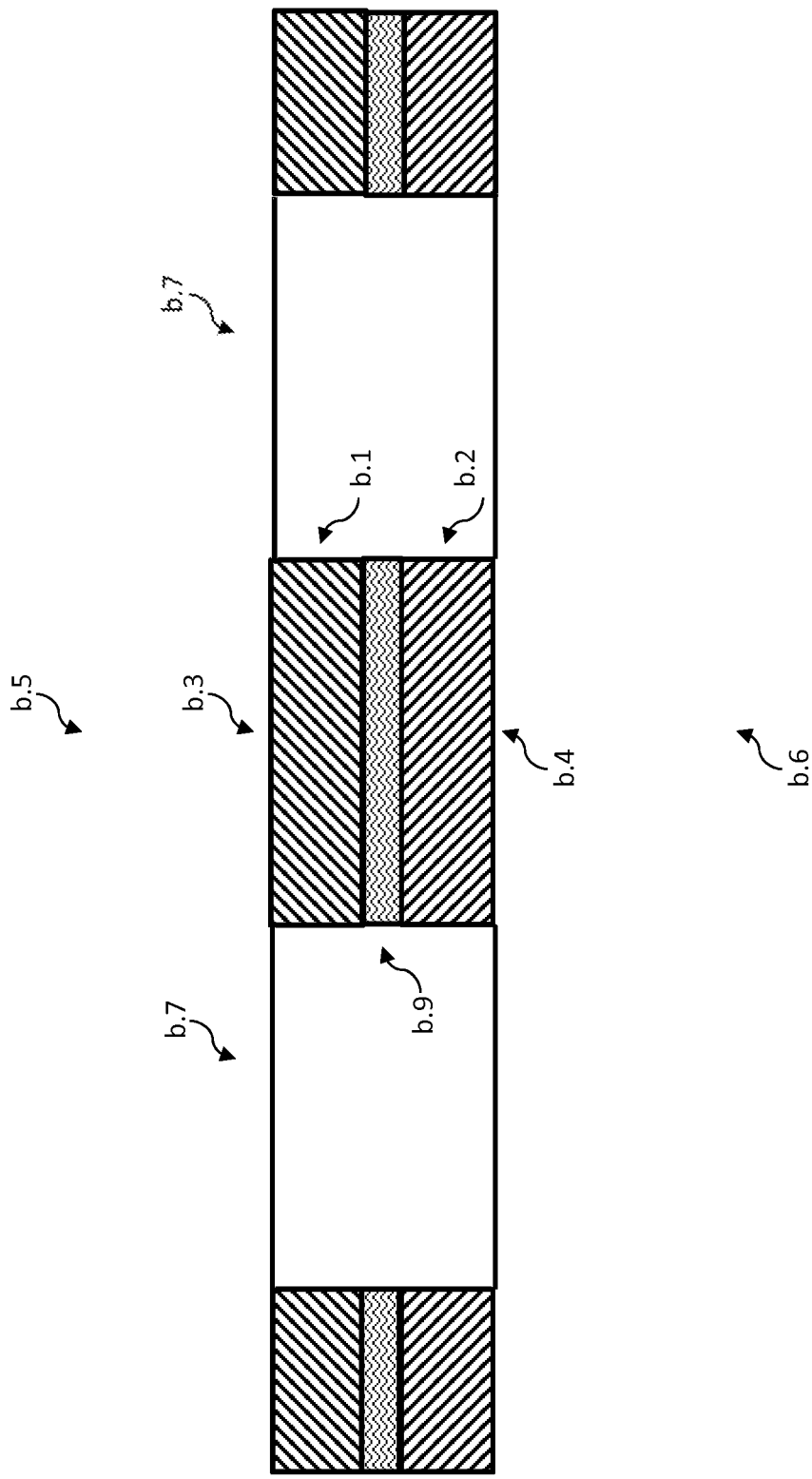
FIG. 2a shows a cross section of another thermal transpiration/radiometric device with a photovoltaic/thermoelectric component.
Figure 2B:
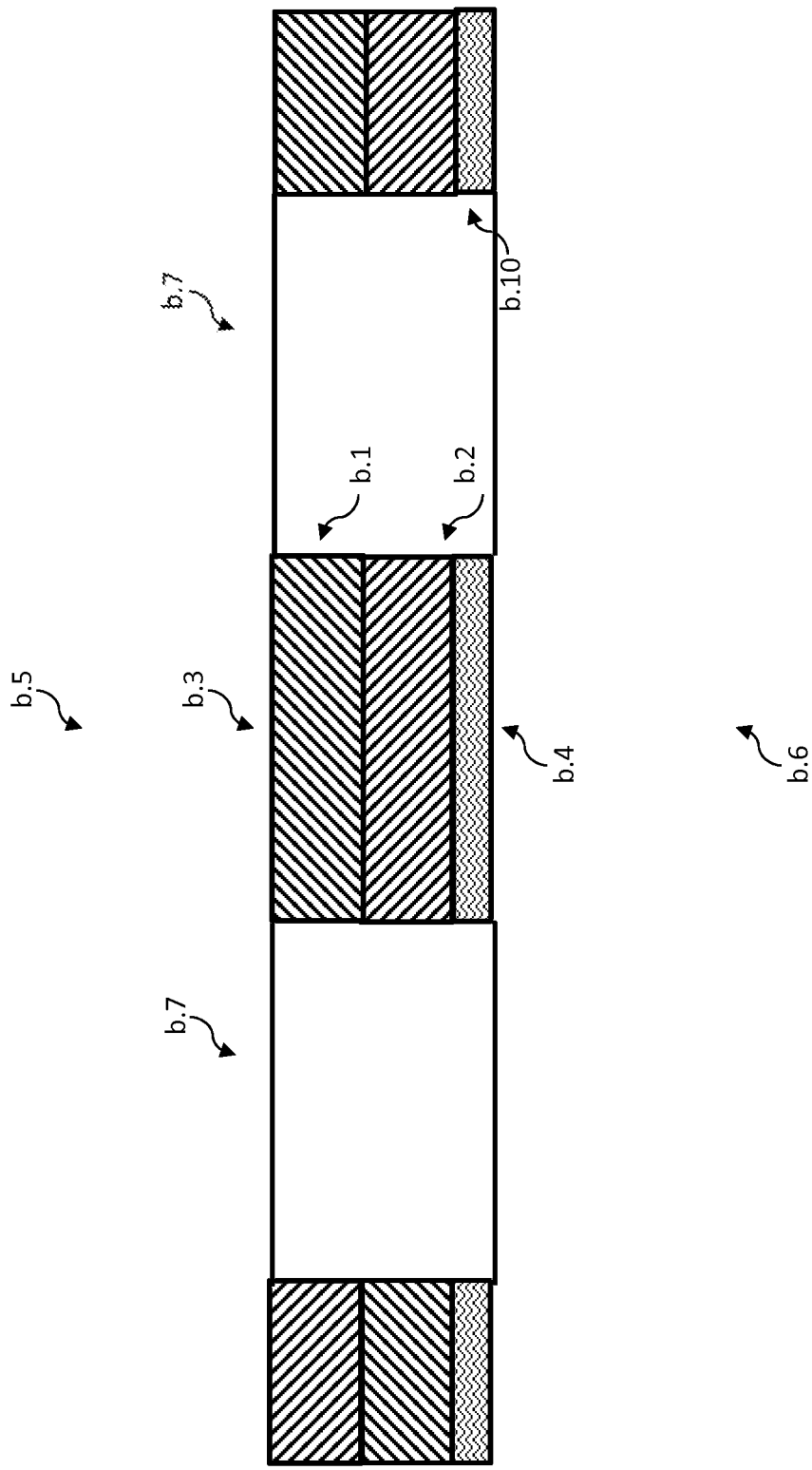
FIG. 2b shows a cross section of a further thermal transpiration/radiometric device with a photovoltaic/thermoelectric component.

Further, if the cooler layer is optically transparent, the photovoltaic membrane b.9 can be sandwiched between the cooler side b.1 and the hotter side b.2 as shown in FIG. 2a. It is also possible to place the photovoltaic film on top of the hotter side, as shown in FIG. 2b, if both the cooler and hotter side are transparent, and/or the device is designed for forward flight away from the sun.

Intake Optimizations

FIG. 6.1 illustrates an aircraft surface f1.1 moving forward through a gas f1.4. An NMSet is being utilized to move ambient gas. Gas flows f1.3 are shown flowing through the membrane, perpendicular to the aircraft surface.

FIG. 6.2 illustrates an aircraft surface f2.1 moving through a gas f2.6. NMSet f2.2 is being utilized to move ambient gas. Gas flows f2.4 are shown flowing through the membrane perpendicular to the aircraft surface and the ambient flow of gas f2.3. The desired action is to maintain an upward force f2.5 on the aircraft surface f2.1 to maintain the aircraft's vertical position. As forward momentum f2.6 increases, flows across the surface f2.3 become more laminar and air flow f2.4 through the microthrusters f2.2 decreases, which decreases the vertical thrust f2.5 placing an upper bound on the forward velocity of the aircraft.

FIG. 6.3 illustrates an aircraft surface f3.0 compensating for the loss of vertical thrust by positioning part of the aircraft surface f3.1 at an angle to the direction of travel f3.7 to increase the airflow f3.4 through the microthrusters f3.2 in an effort to increase the vertical thrust component f3.6. While this increases airflow through the microthrusters f3.4 and therefore the vertical thrust generated, the aircraft surface at an angle f3.1 as well as the microthrusters f3.2 contribute to downward drag f3.5 produced by gas flows f3.3 at an angle or perpendicular to the direction of travel f3.6. This results in the expenditure of more energy to overcome the downward drag f3.5 component.

Intake Scope

A more efficient design is illustrated in FIG. 6.4. In FIG. 6.4 an aircraft surface f4.0 positions a scoop f4.1 over the microthrusters f4.2 and into the direction of travel f4.7, which guides airflow f4.4 through the microthrusters f4.2 and recombines the airflow with airflow under the surface f4.3. This increases airflow to the microthrusters f4.2 and increases the vertical thrust component f4.6. The positioning of the scoop f4.1 creates upward drag f4.5 and drag opposite of the direction of travel f4.8. An intake scoop over a microthrusters array parallel to the surface is novel, and enables the microthrusters to operate in forward velocities faster than the velocities the microthrusters are capable of creating, this allows them to supply the upward thrust while other thrust producing apparatus supply the forward momentum. Further illustrations will explore further optimizations to the microthrusters intake scope invention.

Adjustable Scoops

As the forward velocity increases, drag against the direction of travel f4.8 and the pressure underneath the scoop f4.1 increases. Microthrusters are typically designed to operate inside of a range of pressures. To support a range of forward velocities, desired microthrusters pressures need to be maintained. The microthruster sets shown in FIGS. 6.5a, 6.5b, 6.5c, and 6.6 maintain desired pressure through the use of adjustable scoops.

FIGS. 6.5a, 6.5b, and 6.5c illustrate an aircraft surface f5.0 with one or more groups of microthrusters f5.1. An adjustable scoop assembly is shown as a structure f5.4 that elevates one side of the flap f5.6 over the other that covers a predetermined group of thrusters. It is preferable that the flap f5.6 does not extend to the aircraft surface f5.0. This leaves room for airflow to pass through without building up excessive pressure. The adjustable scoop assembly further f5.4 contains actuators, pressure sensors, control circuitry, and power circuitry, which are not shown here but are known to one skilled in the art.

Adjustable scoops can vary in size, height, placement and orientation dependent on the desired operation. Illustrated is an adjustable scoop toward the back of the aircraft structure f5.0 is made of a taller support structure f5.5 for the adjustable flap f5.7, to maintain higher pressures due to lower available gas pressure as some of the gas has been directed through the microthrusters f5.1.

Further, as shown in FIG. 6.6, an adjustable scoop assembly can operate in pairs. When gas pressure near microthrusters f6.1 is low, flaps f6.8 and f6.9 connected to support structures f6.5 installed on an aircraft surface f6.0 can be lowered to increase the pressure to desirable levels.

Fixed Scoops with Pressure Bleed Off

When the aircraft travels at a known speed, fixed intake scoops can be constructed due to their simplistic nature. As illustrated in FIGS. 6.7a, 6.7b, and 6.7c an airframe f7.0 with groups of microthrusters f7.1 is out fitted with fixed intake scoops f7.2. Flaps can also be designed to maintain a particular pressure difference, above which they will bleed pressure off. In FIGS. 6.7a, 6.7b, and 6.7c a flap f7.4 is attached to a column f7.3. As pressure builds up underneath flap f7.4 it will rise to bleed the pressure off. Further, the flap f7.4 may be weighted to provide the desired pressure difference.

Scoops on a Parallel Surface

Air intake system can be further separated from the propulsion system. FIGS. 6.8a and 6.8b illustrate one such example. An aircraft surface f8.0 contains groups of microthrusters f8.1 on a surface f8.2 above the microthrusters. Further, intake scoops f8.4 and f8.5 and through holes f8.3 are installed. As the aircraft moves forward, gas enters intake scoops f8.4, f8.5 and is forced toward the microthrusters f8.1. The maximum pressure can be controlled by varying the height of the surface f8.2 with the intake scoops f8.4, f8.5. The geometry of an intake scoop f8.5 can further be modified to provide with desired gas flow profiles through the intake f8.5 as well as around it.

Exhaust Optimizations

NMSET and other thermal gradient driven propulsion systems that operate in the slip/transitional flow regime require effective energy transfer to the incoming gas g1.3 flowing from the cooler side g1.1, to the hot side g1.2 through the apertures g1.4. The heat exchanged when the gas flow g1.3 reaches the hot side g1.2 is not optimized. This greatly reduces effectiveness and is one of the main reasons behind ineffective thermal transpiration devices, and hence, force per area.

Surface Geometry & Surface Characteristics

Geometry considerations can be important when considering gas flowing through the membrane. An increase in active surface area as shown in FIGS. 5.1 and 5.2 provides additional area to transfer heat energy to the gas flowing through apertures. Furthermore, high EAC increases the amount of energy transferred per collision and surface roughness further increases total surface area.

FIG. 7.2 illustrates another method for improving gas flow from the cooler surface g2.1 to the hotter surface g2.2 through apertures g2.3. Sections of the hot/cold vane g2.0 are set at an angle to increase the exposed hotter surface g2.2 to the flow of gas from the cooler side g2.7. Additionally, a section of the hot surface is covered with a cooler surface g2.6. This minimizes heating of the cooler gas, thereby increasing flow rates. The cooler side can further be set at an angle as shown by g2.5 to increase aperture size and gas flow volumes.

Exhaust Diffusers

While geometry and surface characteristics are helpful in increasing energy transfer to the gas flowing through the apertures, more aggressive means may be considered when dealing with a range of pressures. At lower Knudsen numbers, as shown in FIG. 7.1, less gas in the center of the aperture g1.5 is able to reach the hotter surfaces g1.2.

To allow for better results, FIG. 7.3 illustrates the use of a parallel surface with gas diffusers g3.6 to spread the gas flows g3.5 flow the cooler surface g3.1 through the apertures g3.5 to the hotter surface g3.2. As the gas flow g3.5 encounters gas diffusers g3.6, the gas flow g3.5 spreads out and increases the surface area of the hotter surface g3.2 that is contacted. The section of the gas diffuser g3.3 facing the hotter surface g3.2 should be covered in a material with a low EAC. Preferably g3.3 is made of a material that is actively cooled. The opposite section of the diffuser g3.4 can be optionally covered in a material with a high EAC and/or made from a material that is actively heated to help increase flow rates and velocities.

Using the provided figures and descriptions, one of ordinary skill in the art will readily understand that the inventions can be combined to increase efficiency. As has been described, embodiments of the present invention have many applications. In particular, though not limited thereto, the uses and improvements can be in the form of microthrusters, and even more particularly NMSet micro-thrusters of many forms and variations disclosed elsewhere herein.

While the foregoing specification teaches the principles of the present invention, with examples provided for the purpose of illustration only, it will be appreciated by one skilled in the art from reading this disclosure that various changes and modifications in form and detail can be made, and equivalents employed, without departing from scope of the appended claims, which are to be given their full breadth.

We claim:

1. A method of combining power generation and propulsion comprising:
   providing a first power source: and
   integrating a power generating membrane, as a secondary power source, with a thrust generating membrane comprising a plurality of microthrusters generating a thrust from a thermal differential,
   wherein said thrust generating membrane includes a first layer and a second layer in a stacked relationship,
   wherein at least one of the first power source and the secondary power source are configured to provide power to establish the thermal differential between the first layer and the second layer such that one of the first layer and the second layer is a cooler layer and the other of the first layer and the second layer is a hotter layer:
   wherein at least one of the cooler layer and the hotter layer is optically transparent:

wherein when the cooler layer is optically transparent, said power generating membrane is sandwiched between the cooler layer and the hotter layer, and wherein when both cooler layer and the hotter layer are optically transparent, said power generating membrane is integrated on a top surface of the hotter layer.

2. The method of claim 1 wherein the thermal differential is established by a thermionic emission.

3. The method of claim 1 wherein the power generating membrane comprises a photovoltaic device.

4. The method of claim 1 wherein the plurality of microthrusters include Networked Micro Scale Electric Thrusters (NMSET) elements.

5. The method of claim 1 wherein the plurality of microthrusters operate in a slip/transitional/molecular flow regime.

6. An apparatus that combines power generation and propulsion comprising:
   a first power source:
   a power generating membrane, as a secondary power source: and
   a thrust generating membrane comprising a plurality of microthrusters configured to generate a thrust from a thermal differential,
   wherein said thrust generating membrane includes at least a first layer and a second layer disposed in a stacked relationship, wherein at least one of the first power source and the secondary power source are configured to provide power to establish the thermal differential between the first layer and the second layer such that one of the first layer and the second layer is a cooler layer and the other of the first layer and the second layer is a hotter layer
   wherein at least one of the cooler layer and the hotter layer is optically transparent:
   wherein when the cooler layer is optically transparent, said power generating membrane is sandwiched between the cooler layer and the hotter layer, and
   wherein when both the cooler layer and the hotter layer are transparent, said power generating membrane is integrated on a top surface of the hotter layer.

7. The apparatus of claim 6 wherein the thermal differential is established by a thermionic emission.

8. The apparatus of claim 6 wherein the power generating membrane comprises a photovoltaic device.

9. The apparatus of claim 6 wherein the plurality of microthrusters operate in a slip/transitional/molecular flow regime.

10. The apparatus of claim 6 wherein the plurality of microthrusters include Networked Micro Scale Electric Thrusters (NMSET) elements.

* * * * *